United States Patent
Yu et al.

(10) Patent No.: US 12,517,298 B2
(45) Date of Patent: Jan. 6, 2026

(54) INTEGRATED 3DIC WITH STACKED PHOTONIC DIES AND METHOD FORMING SAME

(71) Applicant: Taiwan Semiconductor Manufacturing Co., Ltd., Hsinchu (TW)

(72) Inventors: Chen-Hua Yu, Hsinchu (TW); Hsing-Kuo Hsia, Jhubei (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 249 days.

(21) Appl. No.: 18/356,831

(22) Filed: Jul. 21, 2023

(65) Prior Publication Data

US 2023/0358950 A1    Nov. 9, 2023

Related U.S. Application Data

(63) Continuation of application No. 17/648,375, filed on Jan. 19, 2022, now Pat. No. 11,796,735.

(60) Provisional application No. 63/231,051, filed on Aug. 9, 2021, provisional application No. 63/218,671, filed on Jul. 6, 2021.

(51) Int. Cl.
*G02B 6/12* (2006.01)
*G02B 6/136* (2006.01)

(52) U.S. Cl.
CPC ..... *G02B 6/12002* (2013.01); *G02B 6/12004* (2013.01); *G02B 6/136* (2013.01)

(58) Field of Classification Search
None
See application file for complete search history.

(56) References Cited

U.S. PATENT DOCUMENTS

| | | | | |
|---|---|---|---|---|
| 10,162,198 | B2* | 12/2018 | Jou | H01P 3/16 |
| 11,063,013 | B2* | 7/2021 | Chen | H01L 23/5384 |
| 11,150,404 | B2 | 10/2021 | Huang et al. | |
| 2002/0028045 | A1* | 3/2002 | Yoshimura | H01L 23/5389 |
| | | | | 385/39 |
| 2003/0174967 | A1* | 9/2003 | Murali | G02B 6/12002 |
| | | | | 385/50 |
| 2009/0080830 | A1* | 3/2009 | Matsuoka | G02B 6/43 |
| | | | | 385/14 |
| 2013/0336624 | A1* | 12/2013 | Bowen | G02B 6/43 |
| | | | | 385/129 |
| 2014/0321803 | A1* | 10/2014 | Thacker | G02B 6/4274 |
| | | | | 385/14 |
| 2016/0259139 | A1* | 9/2016 | Kraft | G02B 6/4274 |

(Continued)

FOREIGN PATENT DOCUMENTS

KR    20190003296 A    1/2019

*Primary Examiner* — Jerry Rahll
(74) *Attorney, Agent, or Firm* — Slater Matsil, LLP

(57) ABSTRACT

A method includes forming a first photonic die, which includes forming a first silicon waveguide, and forming a first nitride waveguide. The method further includes forming a first through-via extending into a first plurality of dielectric layers in the first photonic die, and bonding a second photonic die to the first photonic die. The second photonic die includes a second nitride waveguide. The first silicon waveguide is optically coupled to the second nitride waveguide through the first nitride waveguide. A second through-via extends into a second plurality of dielectric layers in the second photonic die.

20 Claims, 48 Drawing Sheets

(56) References Cited

U.S. PATENT DOCUMENTS

| | | | |
|---|---|---|---|
| 2017/0207600 A1 | 7/2017 | Klamkin et al. | |
| 2018/0017744 A1* | 1/2018 | DeMeritt | G02B 6/4259 |
| 2018/0224601 A1* | 8/2018 | Low | H05K 1/144 |
| 2018/0314003 A1* | 11/2018 | Coolbaugh | G02B 6/4232 |
| 2019/0369329 A1* | 12/2019 | Huang | G02B 6/34 |
| 2020/0006088 A1* | 1/2020 | Yu | H01L 23/3121 |
| 2020/0166703 A1* | 5/2020 | Charles | G02B 6/136 |
| 2020/0166720 A1* | 5/2020 | Charles | G02B 6/4245 |
| 2021/0325618 A1* | 10/2021 | Leigh | G02B 6/4292 |

* cited by examiner

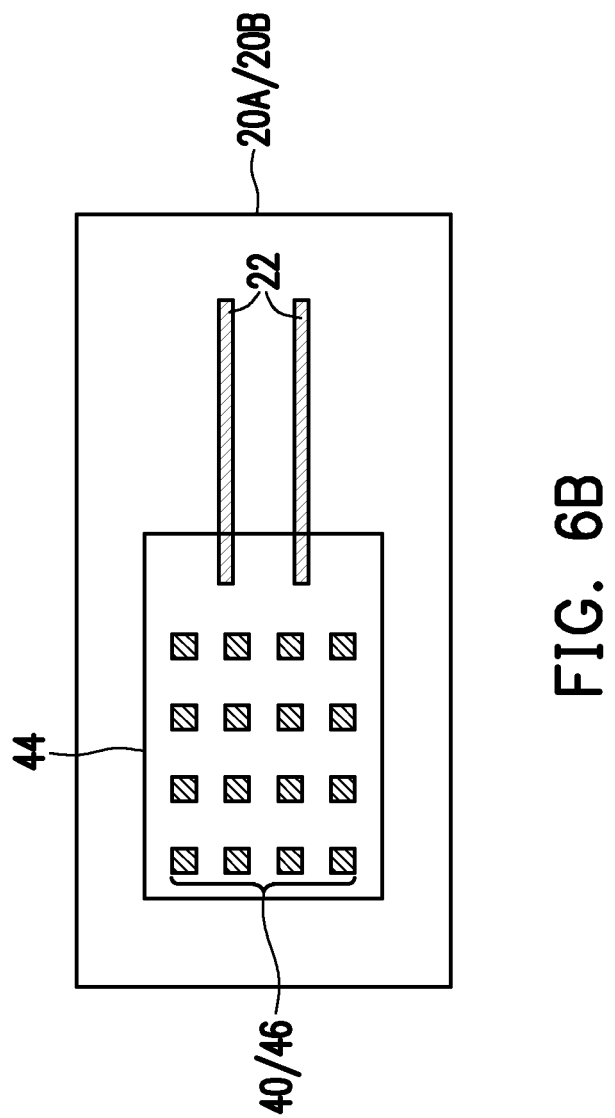

INTEGRATED 3DIC WITH STACKED PHOTONIC DIES AND METHOD FORMING SAME

PRIORITY CLAIM AND CROSS-REFERENCE

This application is a continuation of U.S. patent application Ser. No. 17/648,375, filed on Jan. 19, 2022 and entitled "Integrated 3DIC With Stacked Photonic Dies and Method Forming Same," which claims the benefit of the U.S. Provisional Application No. 63/231,051, filed on Aug. 9, 2021, and entitled "Structure and Process for Photonics 3DIC Package," and U.S. Provisional Application No. 63/218,671, filed on Jul. 6, 2021, and entitled "Structure to Integrate Photonic Silicon in a 3DIC Package" which applications are hereby incorporated herein by reference.

BACKGROUND

Electrical signaling and processing are one of techniques for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1-5, 6A, 6B, and 7-18 illustrate the cross-sectional views of intermediate stages in the formation of a package including stacked photonic dies in accordance with some embodiments.

DETAILED DESCRIPTION

Figure 1:
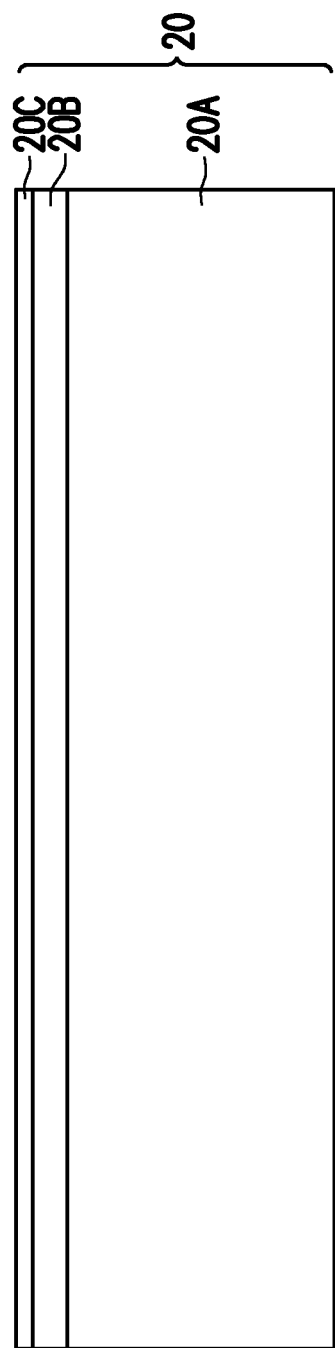

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A package including stacked photonic dies and the method of forming the same are provided. In accordance with some embodiments of the present disclosure, a plurality of photonic dies are formed and stacked, and are bonded to an electronic die. The silicon substrates of some of the photonic dies may be removed in the packaging process, or may be thinned and used for forming optical devices such as silicon waveguides, grating couplers, or the like. Non-silicon waveguides such as silicon nitride waveguides are formed in the stacked photonic dies, and are used as vertical optical vias for passing optical signal. Electrical through-vias are also formed to conduct electrical signals through the stacked photonic dies. With the photonic dies being stacked, the photonic dies occupy a smaller footage. Also, there may be no need to have optical fiber to conduct light between the photonic dies. Embodiments discussed herein are to provide examples to enable making or using the subject matter of this disclosure, and a person having ordinary skill in the art will readily understand modifications that can be made while remaining within contemplated scopes of different embodiments. Throughout the various views and illustrative embodiments, like reference numbers are used to designate like elements. Although method embodiments may be discussed as being performed in a particular order, other method embodiments may be performed in any logical order.

Figure 47:
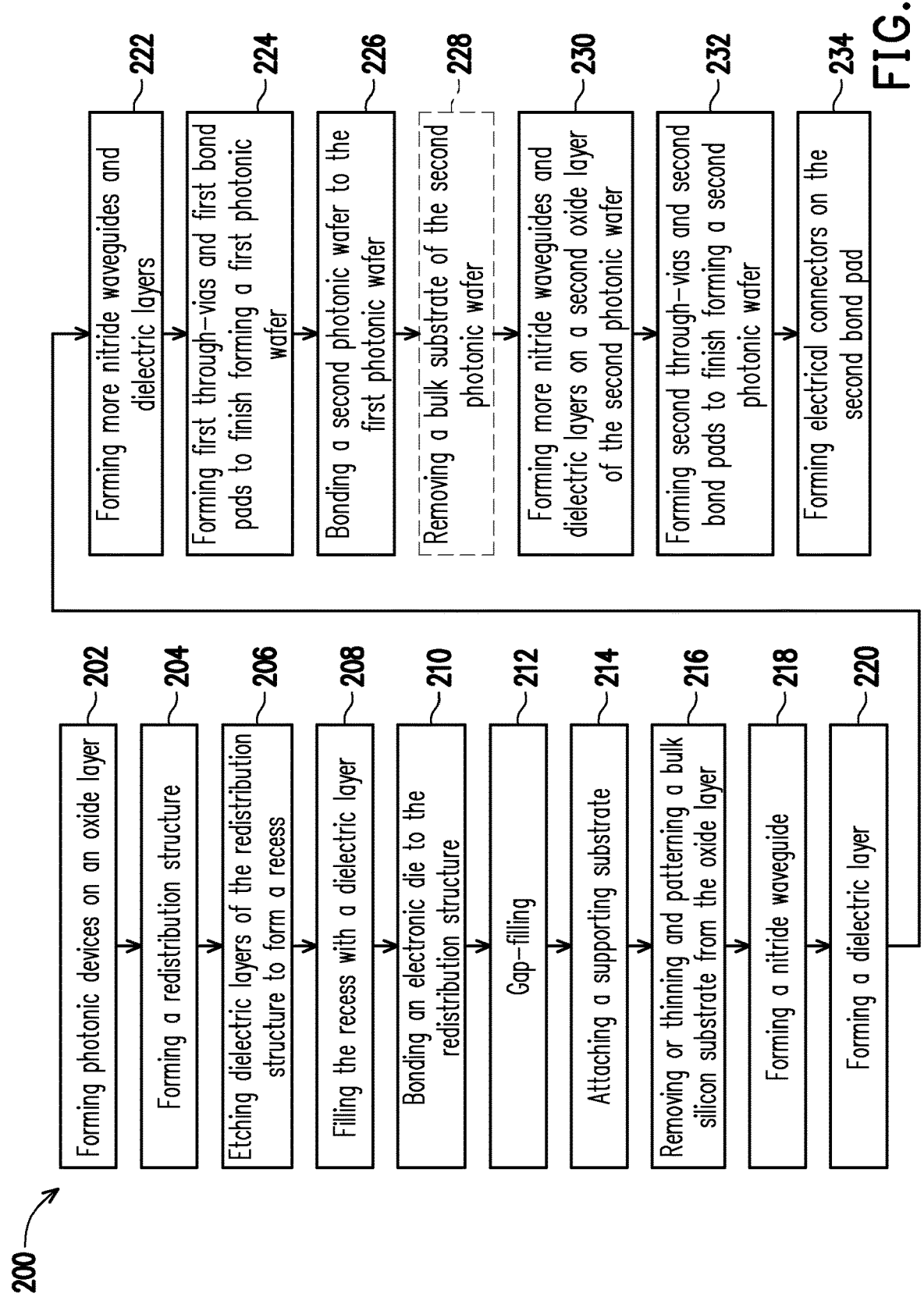
FIG. 47 illustrates a process flow for forming a package including stacked photonic dies in accordance with some embodiments.

FIGS. 1 through 18 illustrate the cross-sectional views of intermediate stages in the formation of a package including stacked photonic dies in accordance with some embodiments of the present disclosure. The corresponding processes are also reflected schematically in the process flow 200 as shown in FIG. 47.

Referring to FIG. 1, base substrate 20 is provided. In accordance with some embodiments, base substrate 20 includes bulk substrate 20A, dielectric layer 20B over bulk substrate 20A, and silicon layer 20C (which is a blanket layer) over dielectric layer 20B. Bulk substrate 20A may be formed of a dielectric material, a semiconductor material, or the like, or a combination thereof. In accordance with some embodiments, bulk substrate 20A includes a semiconductor substrate such as a silicon substrate. Dielectric layer 20B may be formed of or comprise a silicon oxide layer, or may be formed of other dielectric materials (such as silicon oxynitride) that are transparent to light. In accordance with some embodiments, dielectric layer 20B may have a thickness in the range between about 0.5 μm and about 4 μm. Silicon layer 20C may have a thickness in the range between about 0.1 μm and about 1.5 μm. Base substrate 20 may be referred to as having a front side or front surface (e.g., the side facing upwards in FIG. 1), and a back side or back surface (e.g., the side facing downwards in FIG. 1). The front side of the base substrate 20 is also referred to as the front side of the resulting photonic wafer and photonic die.

Figure 2:
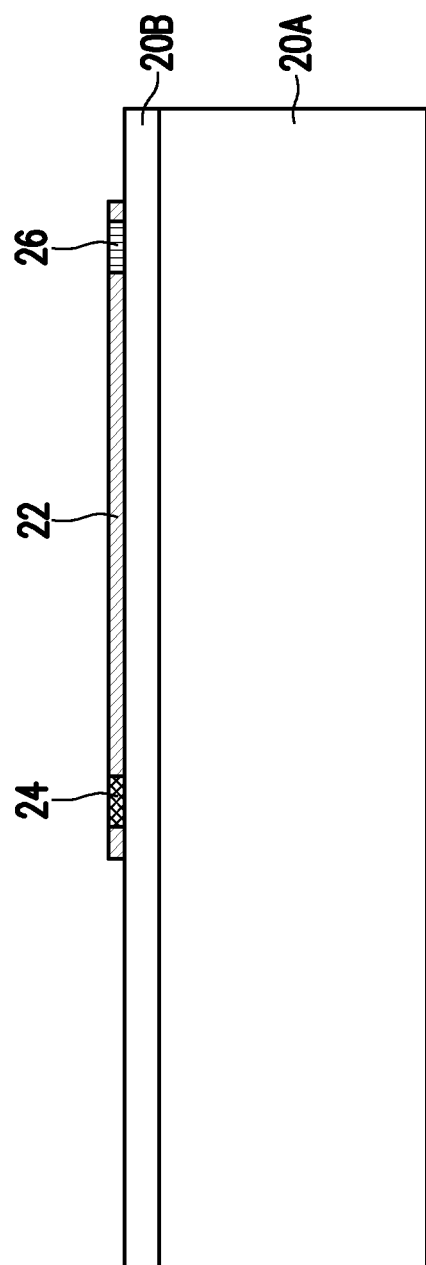

In FIG. 2, silicon layer 20C is patterned to form a plurality of photonic devices, which are also referred to as silicon devices. The respective process is illustrated as process 202 in the process flow 200 as shown in FIG. 47. Some examples of the photonic devices include optical devices, which may include waveguide 22, photonic component 24, and grating coupler 26. It is appreciated that each of the illustrated waveguide 22, photonic component 24, and grating coupler 26 my represent multiple devices. Silicon layer 20C may be patterned using suitable photolithography and etching techniques, which may involve etching processes using photoresists to define patterns. Throughout the description, the features that are formed from silicon layer 20C are collectively referred to as a photonic layer.

In accordance with some embodiments, photonic component 24 is physically and/or optically coupled to waveguide 22 in order to optically interact with waveguide 22 through optical signals. An example photonic component 24 may include, and is not limited to, a photodetector, a modulator, or the like. For example, a photodetector may be optically coupled to waveguide 22 to detect optical signals within waveguide 22 and generate electrical signals corresponding to the optical signals. A modulator may also receive electrical signals and modulate optical power within waveguide 22 to generate corresponding optical signals. In this manner, photonic component 24 may input optical signals from, or output optical signal to, waveguide 22. In accordance with other embodiments, the photonic components may include other active or passive components, such as laser diodes, optical signal splitters, or other types of photonic structures or devices.

In accordance with some embodiments, one or more grating coupler 26 may be integrated with waveguide 22, and may be formed by patterning silicon layer 20C. Grating coupler 26 is a photonic device that allows optical signals and/or optical power to be transferred between waveguide 22 and a photonic component such as the subsequent formed optical through-via, micro-lens, or the like. Grating coupler 26 may be formed using photolithography and etching processes. Grating coupler 26, waveguide 22, and photonic component 24 may share some common etching processes and etching masks.

Figure 3:
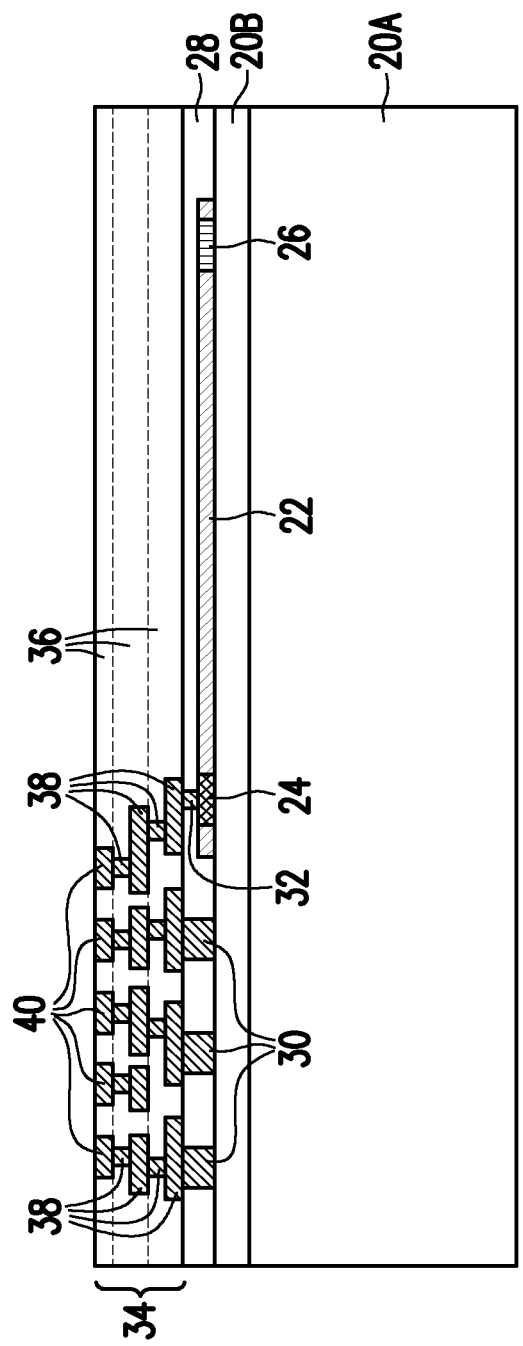

Referring to FIG. 3, dielectric layer 28 is formed on waveguide 22, photonic component 24, grating coupler 26, and dielectric layer 20B. Dielectric layer 28 may be formed of or comprises one or more layers of silicon oxide, silicon nitride, a combination thereof, or the like, and may be formed by CVD, PVD, atomic layer deposition (ALD), a spin-on-dielectric process, high density plasma chemical vapor deposition (HDP-CVD), flowable CVD (FCVD), or the like, or a combination thereof. Dielectric layer 28 is transparent to light. In accordance with some embodiments, dielectric layer 28 is planarized through a planarization process such as a CMP process or a mechanical grinding process. The portion of dielectric layer 28 over the optical layer may have a thickness in the range between about 10 nm and about 500 nm.

Due to the difference in refractive indices of the materials of waveguide 22 and dielectric layer 28, waveguide 22 have high internal reflections such that light is substantially confined within waveguide 22, depending on the wavelength of the light and the refractive indices of the respective materials. In accordance with some embodiments, the refractive index of the material of waveguide 22 is higher than the refractive index of the material of dielectric layer 28. For example, waveguide 22 may comprise silicon, and dielectric layer 28 may comprise silicon oxide.

Further referring to FIG. 3, vias 30 and contact plug 32 are formed in dielectric layer 28. In accordance with some embodiments, vias 30 and contact plug 32 are formed through damascene process, e.g., single damascene, dual damascene, or the like. Vias 30 may be formed, for example, by forming openings extending through dielectric layer 28, and filling the openings with conductive materials. The conductive material may include a diffusion barrier layer formed of TiN, TaN, Ti, Ta, or the like, and a metallic material such as tungsten, copper, cobalt, or the like. A planarization process such as a CMP process or a mechanical grinding process may be performed to remove excess conductive material. The remaining portions of the diffusion barrier layer and the metallic material are vias 30 and contact plugs 32. The contact plugs are electrically connected to optical component.

In accordance with some embodiments, contact plug 32 extends through dielectric layer 28, and is electrically connected to photonic component 24. Contact plug 32 allows electrical power or electrical signals to be transmitted to photonic component 24, and electrical signals to be transmitted from photonic component 24. In this manner, photonic component 24 may convert electrical signals into optical signals transmitted by waveguide 22, and/or may convert optical signals from waveguide 22 into electrical signals.

Further referring to FIG. 3, redistribution structure 34 is formed over dielectric layer 28. The respective process is illustrated as process 204 in the process flow 200 as shown in FIG. 47. Redistribution structure 34 includes dielectric layers 36 and conductive features 38 formed in dielectric layers 36. Conductive features 38 provide interconnections and electrical routing. Conductive features 38 are electrically connect to vias 30, contact plug 32, and/or overlying devices such as electronic dies. Dielectric layers 36 may be, for example, insulating and/or passivating layers, and may comprise silicon oxide, silicon nitride, or another material. Dielectric layers 36 may be transparent or opaque to light. Dielectric layers 36 may be formed through a damascene process. Conductive pads 40 are formed in the topmost layer of dielectric layers 36.

Figure 4:
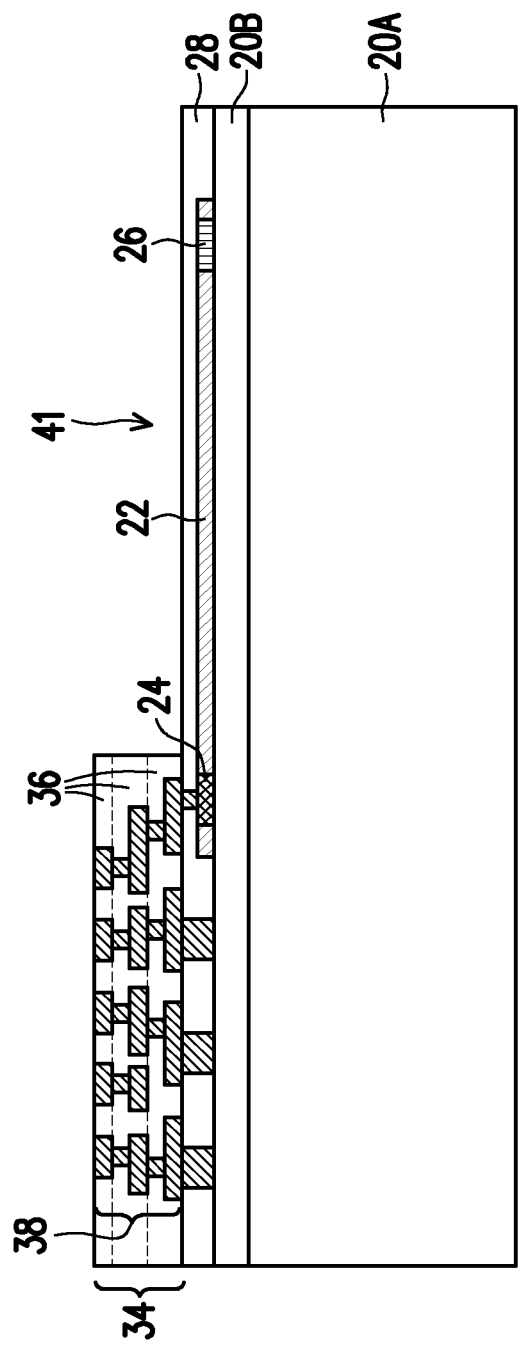
Figure 5:
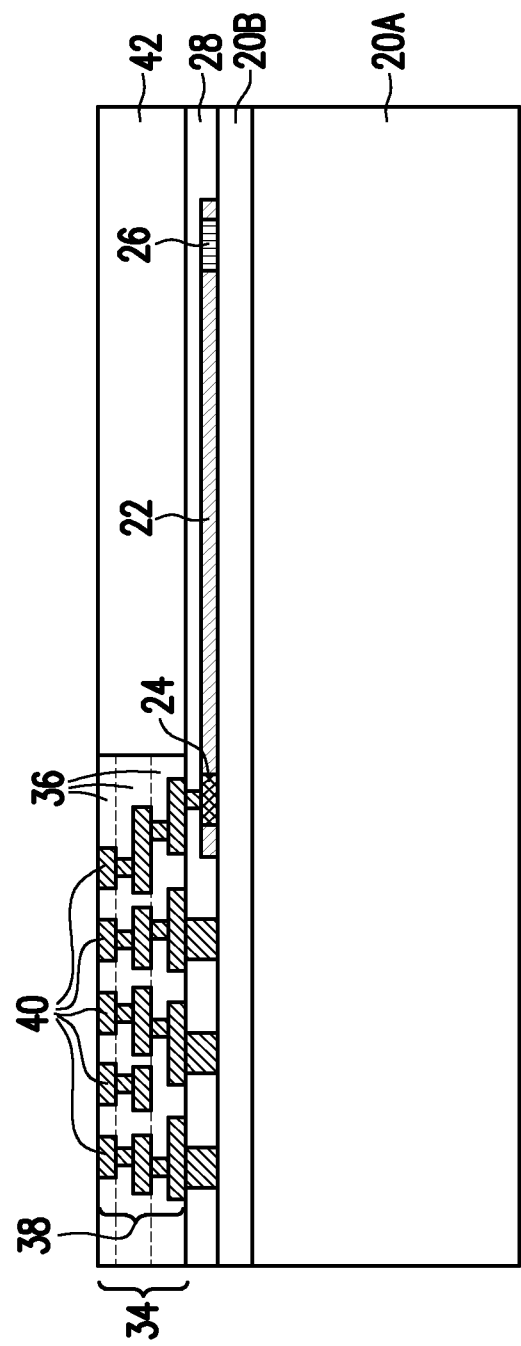

In FIGS. 4 and 5, a portion of redistribution structure 34 is removed and replaced by dielectric layer 42. Referring to FIG. 4, a portion of redistribution structure 34 may be removed through etching, so that recess 41 is formed. The respective process is illustrated as process 206 in the process flow 200 as shown in FIG. 47. The removed portion of redistribution structure 34 may be directly over a grating coupler 26. Next, as shown in FIG. 5, dielectric layer 42 is deposited, followed by a planarization process to reveal conductive pads 40. The respective process is illustrated as process 208 in the process flow 200 as shown in FIG. 47.

Figure 8:
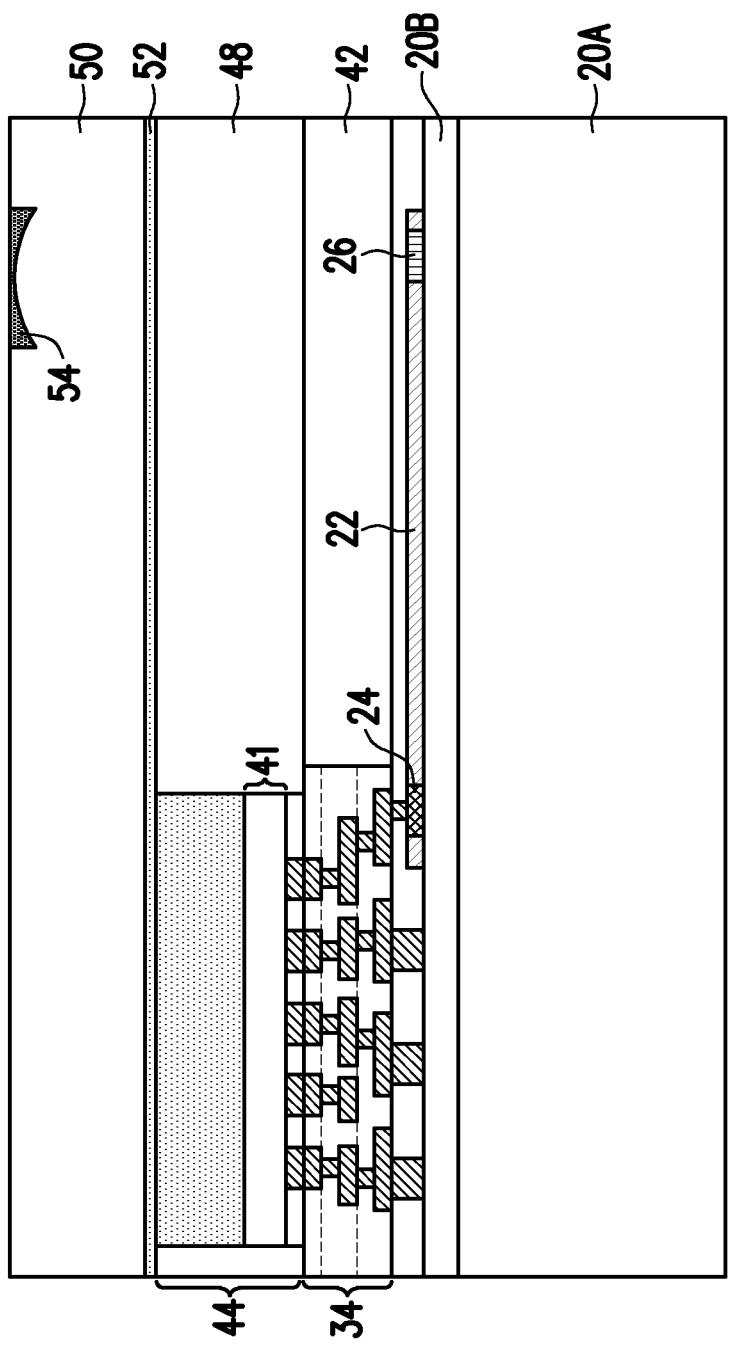

The material of the dielectric layer 42 is selected to provide more efficient optical coupling between grating coupler 26 and a vertically-mounted optical fiber (not shown) and/or micro lens (such as micro lens 54 in FIG. 8). For example, the dielectric layer 42 may be more transparent, having lower loss, and is less reflective than dielectric layers 36. In accordance with some embodiments, the material of the dielectric layer 42 is similar to that of dielectric layers 36, but is deposited using a technique that forms the material having a better quality (e.g., less impurities, dislocations, etc.). In this manner, replacing a portion of dielectric layers 36 of redistribution structure 34 with the dielectric layer 42 may allow for more efficient operation of the resulting photonic package, and may reduce optical signal loss. For example, dielectric layer 42 may be formed of or comprise silicon oxide.

In accordance with other embodiments, dielectric layers 36 are not replaced with dielectric layer 42. In these embodiments, some regions of redistribution structure 34 may be substantially free of the conductive features 38 and conductive pads 40 in order to allow for the transmission of optical signals through dielectric layers 36. For example, these metal-free regions may extend between a grating coupler 26 and a micro lens 54 (FIG. 8), which may be aligned to a vertically-mounted optical fiber to allow optical signals to be coupled between grating coupler 26 and the optical fiber.

Figure 6A:
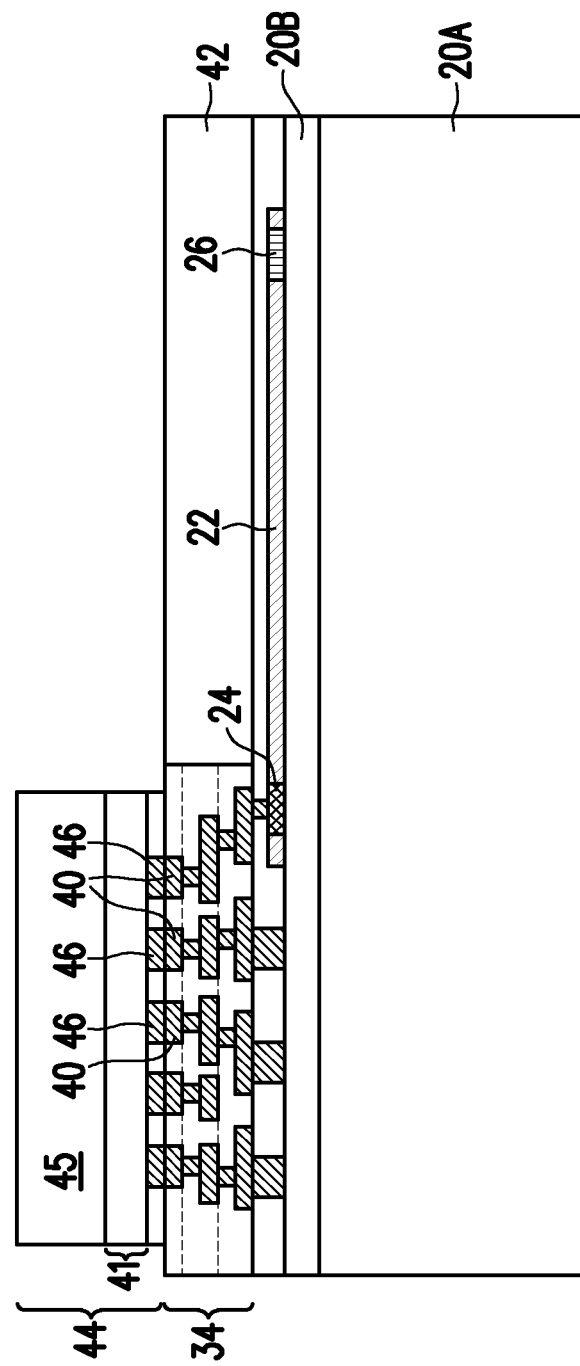

Referring to FIG. 6A, one (or more) electronic die 44 is bonded to redistribution structure 34, in accordance with some embodiments. The respective process is illustrated as process 210 in the process flow 200 as shown in FIG. 47. Electronic die 44 may be, for example, semiconductor devices, dies, or chips that communicate with photonic component 24 using electrical signals. One electronic die 44 is shown in FIG. 6A, while a resulting photonic package 70' (FIG. 18) may also include two or more electronic die 44 in accordance with other embodiments. Electronic die 44 includes semiconductor substrate 45, interconnect structure 41, and electrical connectors 46, which may be, for example, conductive pads, conductive pillars, or the like.

Electronic die 44 may include integrated circuits for interfacing with photonic component 24, such as the circuits for controlling the operation of photonic component 24. For example, electronic die 44 may include controllers, drivers, amplifiers, the like, or combinations thereof. Electronic die 44 may also include a CPU. In accordance with some embodiments, electronic die 44 includes the circuits for processing electrical signals received from photonic component 24. Electronic die 44 may also control high-frequency signaling of photonic component 24 according to electrical signals (digital or analog) received from another device or die, in accordance with some embodiments. In accordance with some embodiments, electronic die 44 may be an electronic integrated circuit (EIC) or the like that provides Serializer/Deserializer (SerDes) functionality. In this manner, electronic die 44 may act as part of an I/O interface between optical signals and electrical signals.

In accordance with some embodiments, electronic die 44 is bonded to redistribution structure 34 through hybrid bonding (which includes both of dielectric-to-dielectric bonding and metal-to-metal bonding), direct metal-to-metal bonding, solder bonding, or the like.

FIG. 6B illustrates an example top view of the structure shown in FIG. 6A. In accordance with some embodiments, waveguides 22 extends underlying electronic die 44. There may be multiple waveguides 22. Also, there may be multiple bond pads 40 and 46.

Figure 7:
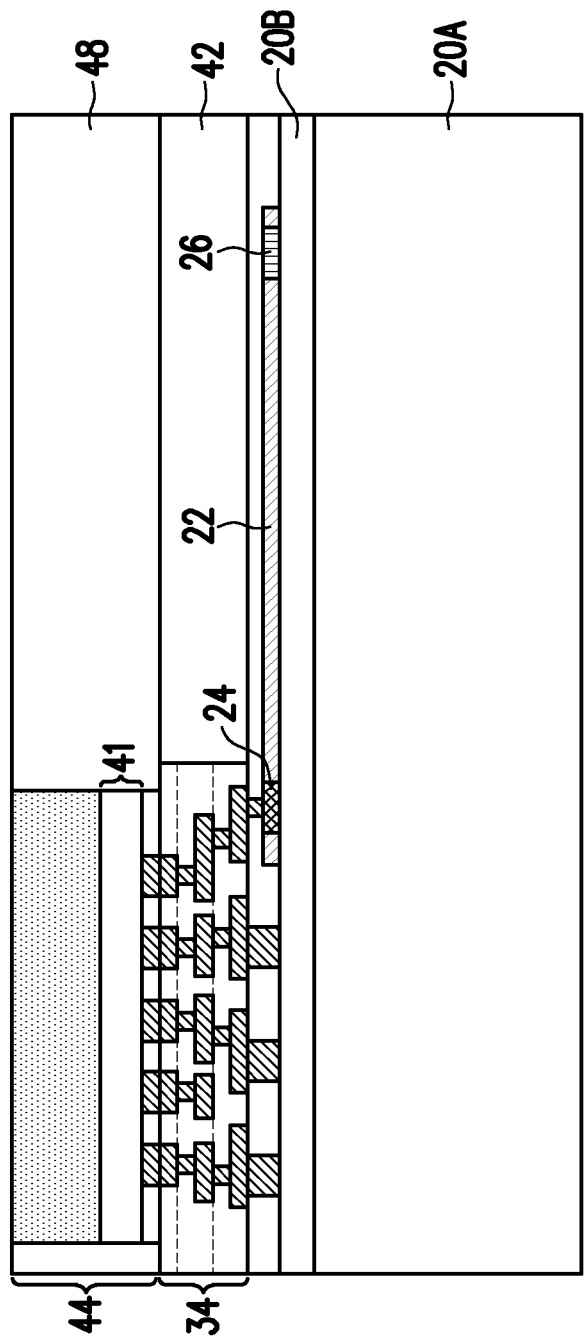

Referring to FIG. 7, gap-filling material 48 is formed over electronic die 44 and redistribution structure 34. The respective process is illustrated as process 212 in the process flow 200 as shown in FIG. 47. Gap-filling material 48 may be formed of silicon oxide, silicon nitride, a polymer, the like, or a combination thereof. Gap-filling material 48 may be formed through CVD, PVD, ALD, a spin-on coating process, HDP-CVD, FCVD, the like, or a combination thereof. Gap-filling material 48 may be a material (e.g., silicon oxide) that is transparent to light at wavelengths suitable for transmitting optical signals or optical power therein. In accordance with some embodiments in which light is not to be projected upwardly through gap-filling material 48, gap-filling material 48 may comprise a relatively opaque material such as an encapsulant, molding compound, or the like. Gap-filling material 48 may be planarized using a planarization process such as a CMP process, a grinding process, or the like. In accordance with some embodiments, the planarization process may expose electronic die 44, with the top surfaces of electronic die 44 and gap-filling material 48 being coplanar.

FIG. 8 illustrates the attachment of supporting substrate 50. The respective process is illustrated as process 214 in the process flow 200 as shown in FIG. 47. In accordance with some embodiments, a silicon-containing dielectric layer 52, which may comprise silicon oxide, silicon oxynitride, silicon carbo-nitride, or the like, is used to bond supporting substrate 50 to the semiconductor substrate of electronic die 44, and to gap-filling material 48. The bonding may be performed through fusion bonding, with Si—O—Si bonds formed. There may be a micro lens 54 formed in supporting substrate 50. In accordance with some embodiments, supporting substrate 50 is or comprises a silicon substrate.

Figure 9:
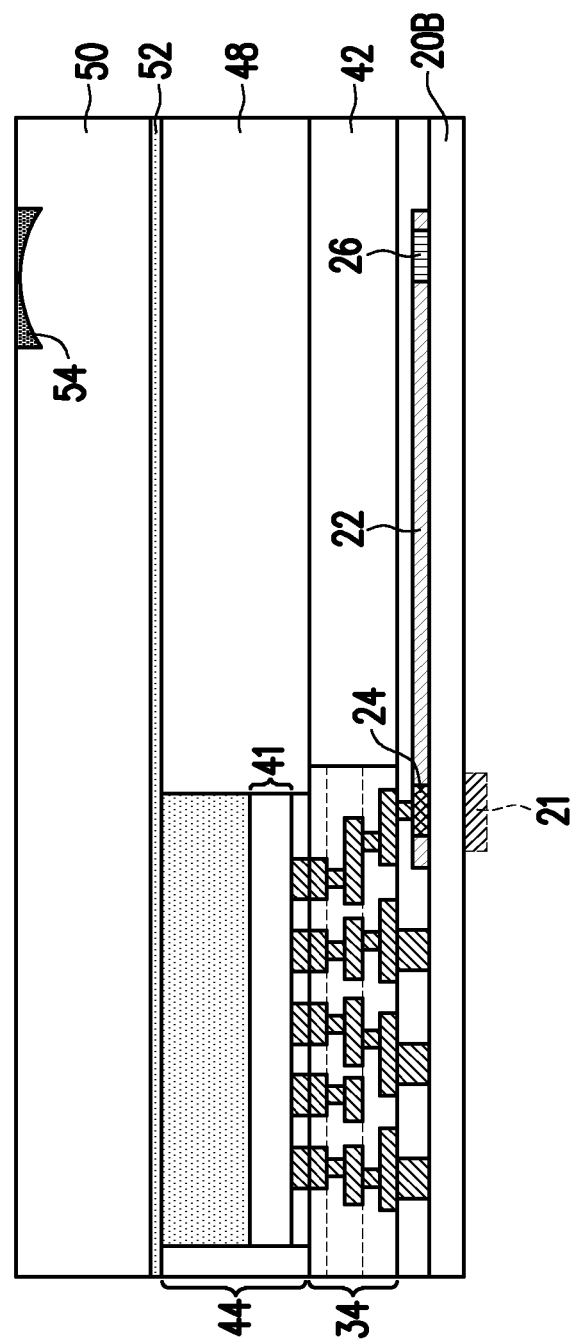

Next, bulk substrate 20A may be removed. The respective process is illustrated as process 216 in the process flow 200 as shown in FIG. 47. The resulting structure is shown in FIG. 9. Bulk substrate 20A may be removed using a planarization process (e.g., a CMP or grinding process), an etching process, a combination thereof, or the like. In accordance with some embodiments, dielectric layer 20B is also thinned. Dielectric layer 20B may be thinned as part of the removal process for bulk substrate 20A, or dielectric layer 20B may be thinned in a separate step. In accordance with some embodiments, after thinning, dielectric layer 20B may have a thickness in the range of about 0.05 μm to about 0.5 μm.

In accordance with alternative embodiments, instead of fully removing bulk silicon substrate 20A, bulk silicon substrate 20A is thinned, and then patterned, forming silicon features 21, which may include silicon waveguides, grating couplers, photonic components, or the like, which are essentially the same as discussed above for silicon waveguides 22, grating couplers 26, and photonic components 24, respectively. The respective process is also illustrated as process 216 in the process flow 200 as shown in FIG. 47. In FIG. 9 and the resulting package 70' (FIG. 18), silicon features 21 are illustrated as being dashed to indicate that silicon features 21 may be, or may not be, formed.

Figure 10:
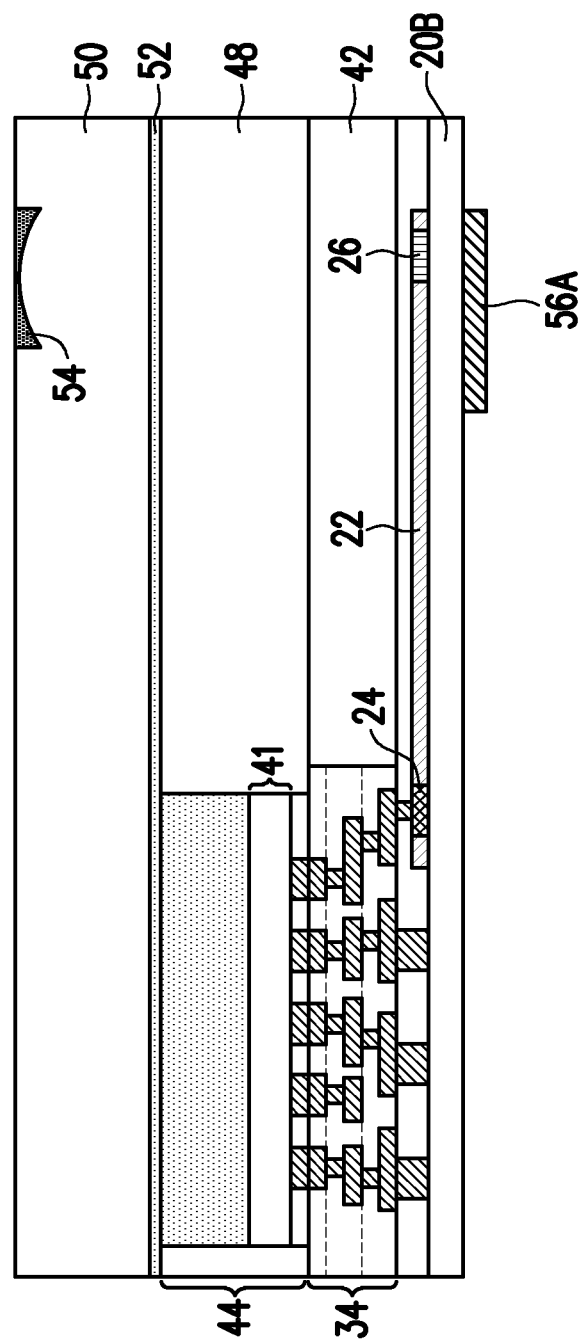

In subsequent processes, nitride waveguides 56 (including 56A and 56B, and possibly more) are formed. Referring to FIG. 10, nitride waveguide 56A is formed on dielectric layer 20B. The respective process is illustrated as process 218 in the process flow 200 as shown in FIG. 47. The formation process may include a deposition process, followed by a patterning process through etching. The deposition process may include CVD, PECVD, LPCVD, PVD, or the like. Nitride waveguide 56A may be formed of or comprise silicon nitride, silicon oxynitride, or the like. Alternatively, instead of forming nitride waveguide 56A, a polymer waveguide may be formed. In accordance with some embodiments, the thickness of nitride waveguide 56A may be in the range between about 0.2 µm and about 1.0 µm, while other thicknesses are possible.

In accordance with some embodiments, nitride waveguide 56A may include photonic structures such as grating couplers, edge couplers, or couplers (e.g., mode converters) that allow optical signals to be transmitted or processed. A waveguide formed from silicon nitride (e.g., nitride waveguide 56A) may have advantages over a waveguide formed from silicon (e.g., waveguide 22). For example, silicon nitride has a higher dielectric constant than silicon, and thus a nitride waveguide may have a greater internal confinement of light than a silicon waveguide. This may also allow the performance or leakage of nitride waveguides to be less sensitive to process variations, less sensitive to dimensional uniformity, and less sensitive to surface roughness (e.g., edge roughness or linewidth roughness). The reduced process sensitivity may allow nitride waveguides to be easier or less costly to process than silicon waveguides. These characteristics may allow a nitride waveguide to have a lower propagation loss than a silicon waveguide. In some cases, the propagation loss (dB/cm) of a nitride waveguide may be between about 0.1% and about 50% of a silicon waveguide.

Figure 11:
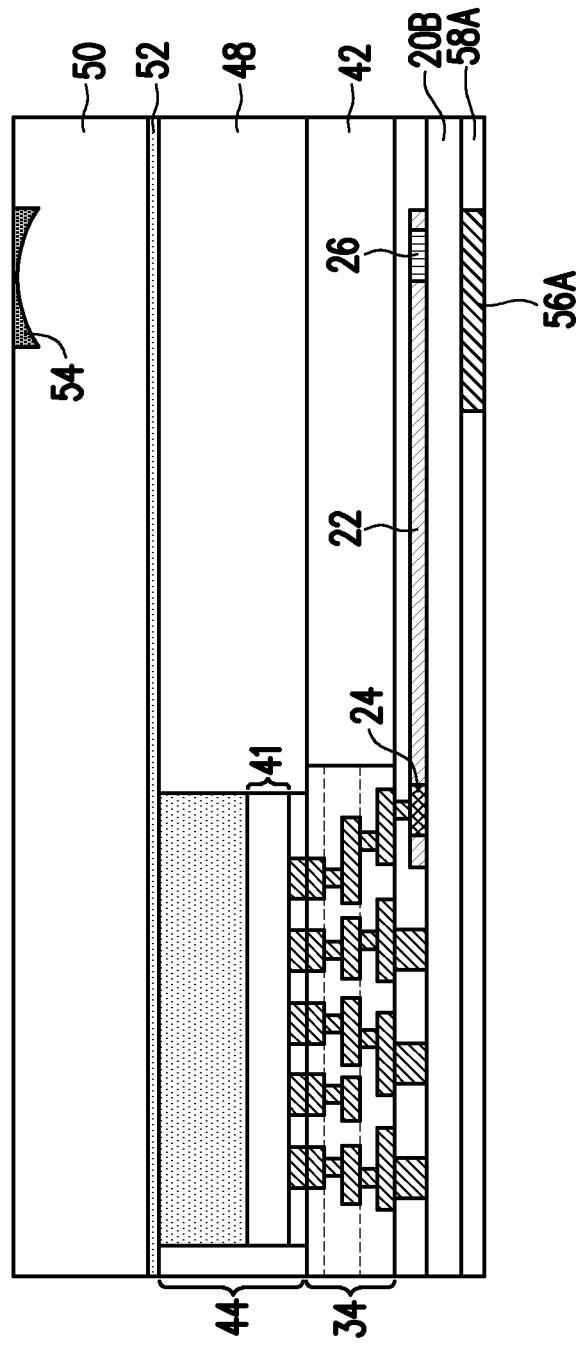

Referring to FIG. 11, dielectric layer 58A is formed on nitride waveguide 56A. The respective process is illustrated as process 220 in the process flow 200 as shown in FIG. 47. Dielectric layer 58A may comprise one or more materials similar to those described above for dielectric layer 28 or dielectric layer 42. For example, dielectric layer 58A may comprise silicon oxide, a spin-on glass, or the like. Dielectric layer 58A may be formed using a process similar to those described above for dielectric layer 28 or the dielectric layer 42, or may be formed using a different process. For example, dielectric layer 58A may be formed using CVD, PVD, spin-on coating, or the like, while another process may be used. In accordance with some embodiments, a planarization process such as a CMP process or a mechanical grinding process is used to remove excess material of dielectric layer 58A. After the planarization, dielectric layer 58A may have a surface (the illustrated bottom surface) coplanar with a surface of nitride waveguide 56A. Alternatively, dielectric layer 58A may be thicker than, and may have a portion overlapped by, nitride waveguide 56A.

Figure 12:
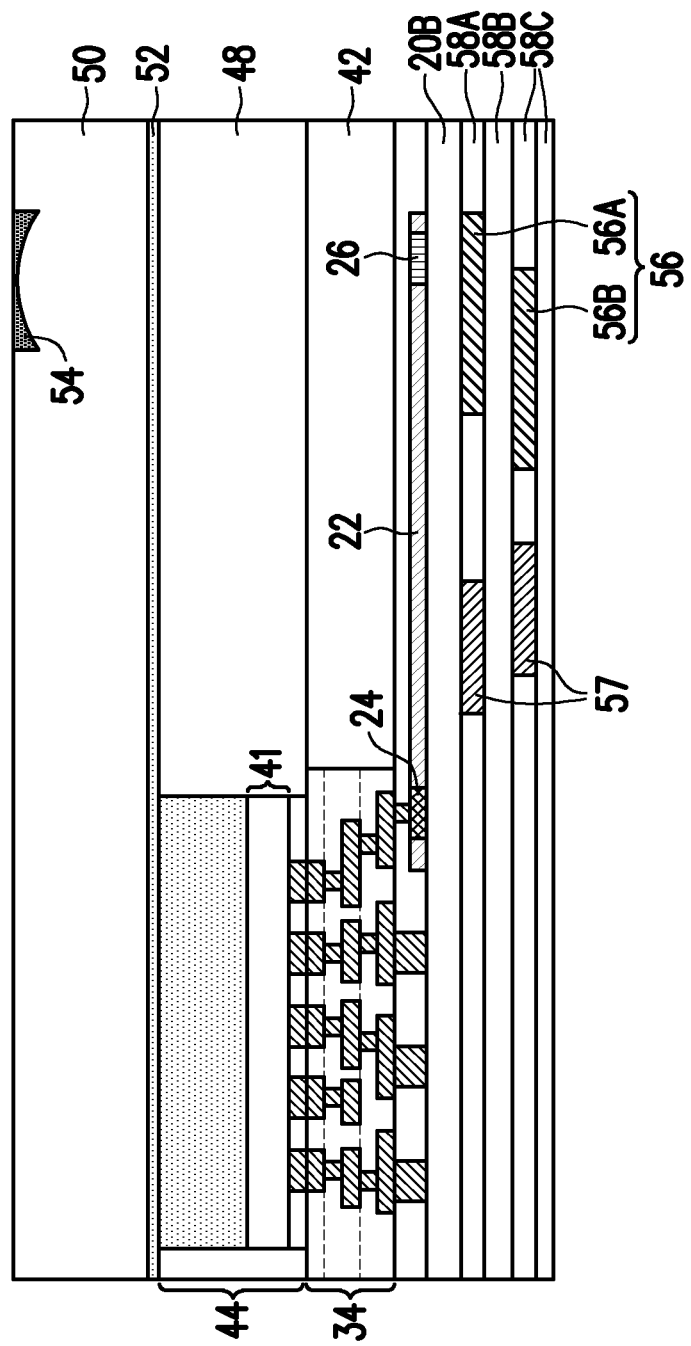

Referring to FIG. 12, more nitride waveguide(s) 56 (including waveguide 56B) and dielectric layer(s) 58 (including dielectric layers 58B and 58C) are formed layer by layer. The respective process is illustrated as process 222 in the process flow 200 as shown in FIG. 47. Reflectors 57, which may be formed of metals such as copper, tungsten, nickel, or the like, may also be formed. The additional nitride waveguide(s) 56 and dielectric layer(s) 58 may be formed using materials and processes selected from the same candidate materials and processes for forming waveguide 56A and dielectric layer 58A. In accordance with some embodiments, the additional nitride waveguides 56 are physically separated from its overlying nitride waveguides 56 by dielectric layers 58. Furthermore, at least some or all of nitride waveguides 56 are fully enclosed in dielectric layers 58. Alternatively stated, all of the surfaces of at least some, or all, of nitride waveguides 56 are in contact with dielectric layers 58. Each of waveguides 56 may have at least a portion, or an entirety, overlapped by the immediate overlying waveguide 56. Furthermore, each of waveguide 56 and its immediate overlying waveguide 56 may be separated by small vertical distances, for example, smaller than about 1 µm.

Figure 13:
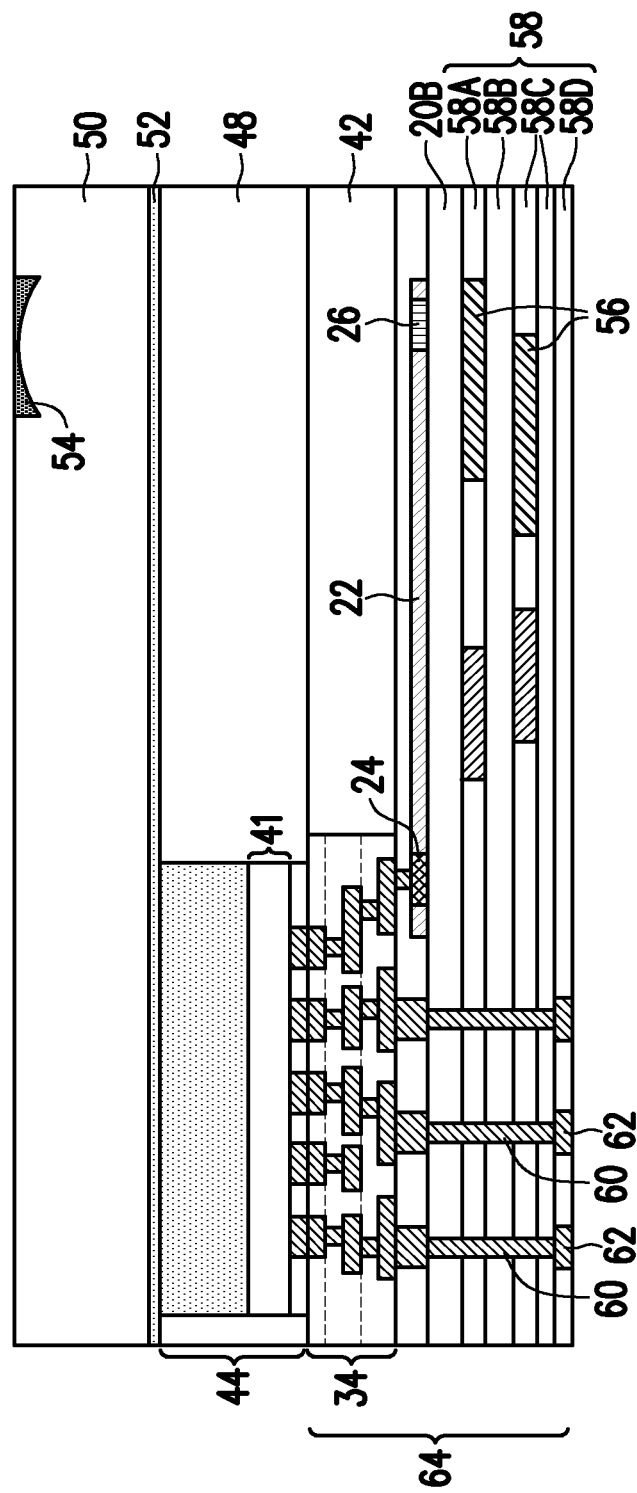

Referring to FIG. 13, (electrical conductive) through-vias 60 and bond pads 62 are formed in dielectric layers 58 and dielectric layer 20B. The respective process is illustrated as process 224 in the process flow 200 as shown in FIG. 47. The formation process may include etching-through dielectric layers 58 and dielectric layer 20B to form via openings, and to reveal vias 30, filling the via openings with conductive materials (such as TiN, TaN, Ti, Ta, Cu, W, Co, or the like), and performing a planarization process. There may be, or may not be, a dielectric liner formed encircling the conductive materials. Bond pads 62 are also formed, and an additional dielectric layer 58D may be formed. Dielectric layer 58D may be formed of a material similar to other dielectric layers 58. Photonic wafer 64 is thus formed, which is bonded to electronic die 44.

Figure 14:
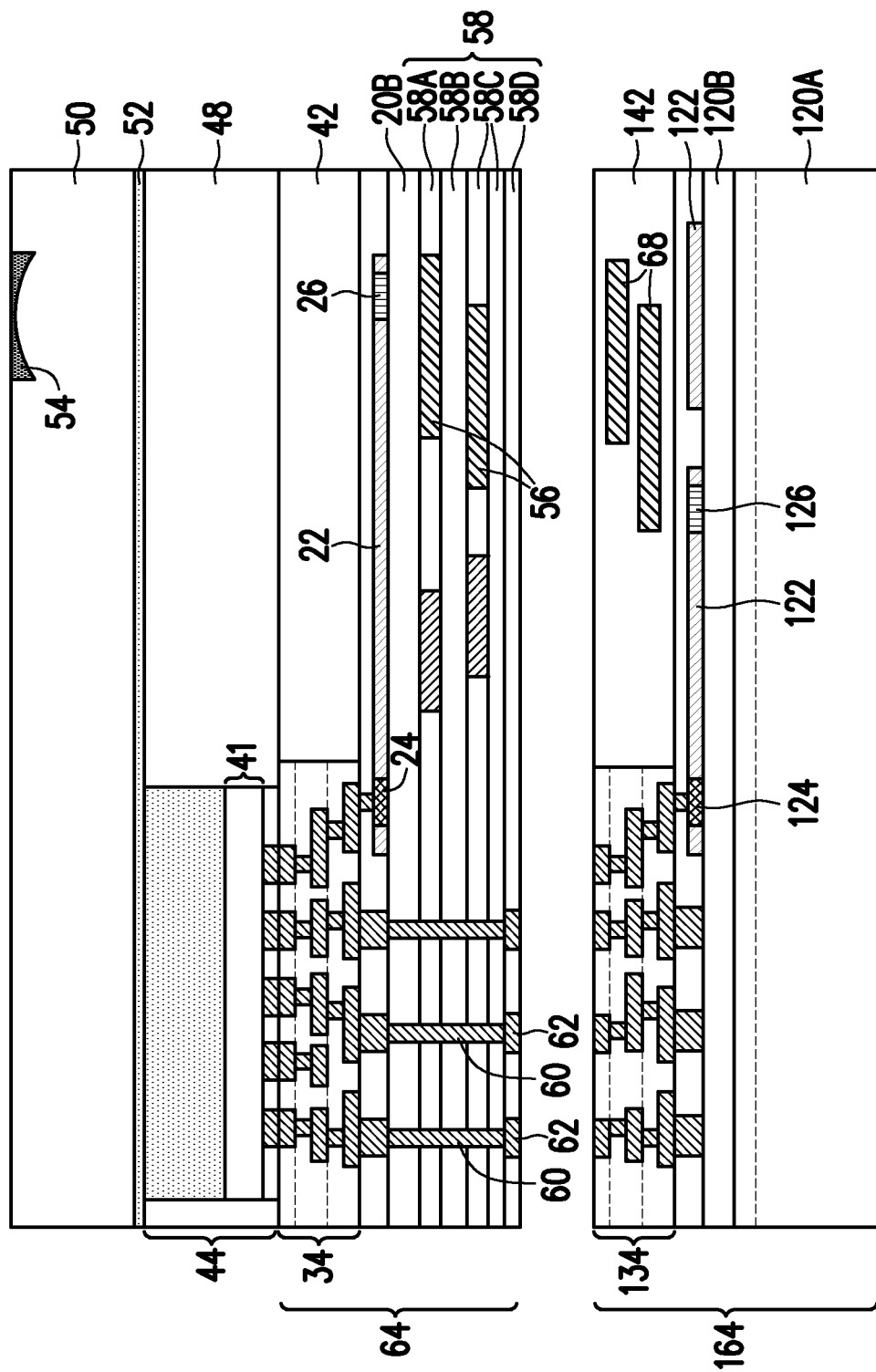

Referring to FIG. 14, photonic wafer 164 is formed. In accordance with some embodiments, photonic wafer 164 is formed using similar processes as (or different processes than) the processes for forming photonic die wafer 64. The structure of photonic wafer 164 may be identical as, similar as, or different from the structure of Referring to FIG. 14, photonic wafer 164 is formed. In accordance with some embodiments, photonic wafer 164 is formed using similar processes as (or different processes than) the processes for forming photonic wafer 64. The structure of photonic wafer 164 may be identical as, similar as, or different from the structure of photonic wafer 64. In accordance with some embodiments, the components in photonic wafer 164 are denoted using the reference numbers of the like components in photonic die 64, with a number "1" added as a prefix. The like components in photonic wafer 164 may be similar to the corresponding components in photonic wafer 64. For example, the waveguide, the photonic component, the grating coupler, and the nitride waveguide in photonic wafer 164 are denoted using reference notations 122, 124, 126, and 156, respectively. Also, redistribution structure 134, dielectric layer 128, dielectric layer 142, vias 130 and 132, bulk substrate 120A and oxide layer 120B, and bond pads 140 may also be formed.

In accordance with some embodiments, nitride waveguides 68 are formed in dielectric layer 142. In accordance with alternative embodiments when redistribution structure 134 is thin, for example, thinner than about 2 µm or about 1 µm, no nitride waveguide is formed in dielectric layer 142.

Figure 15:
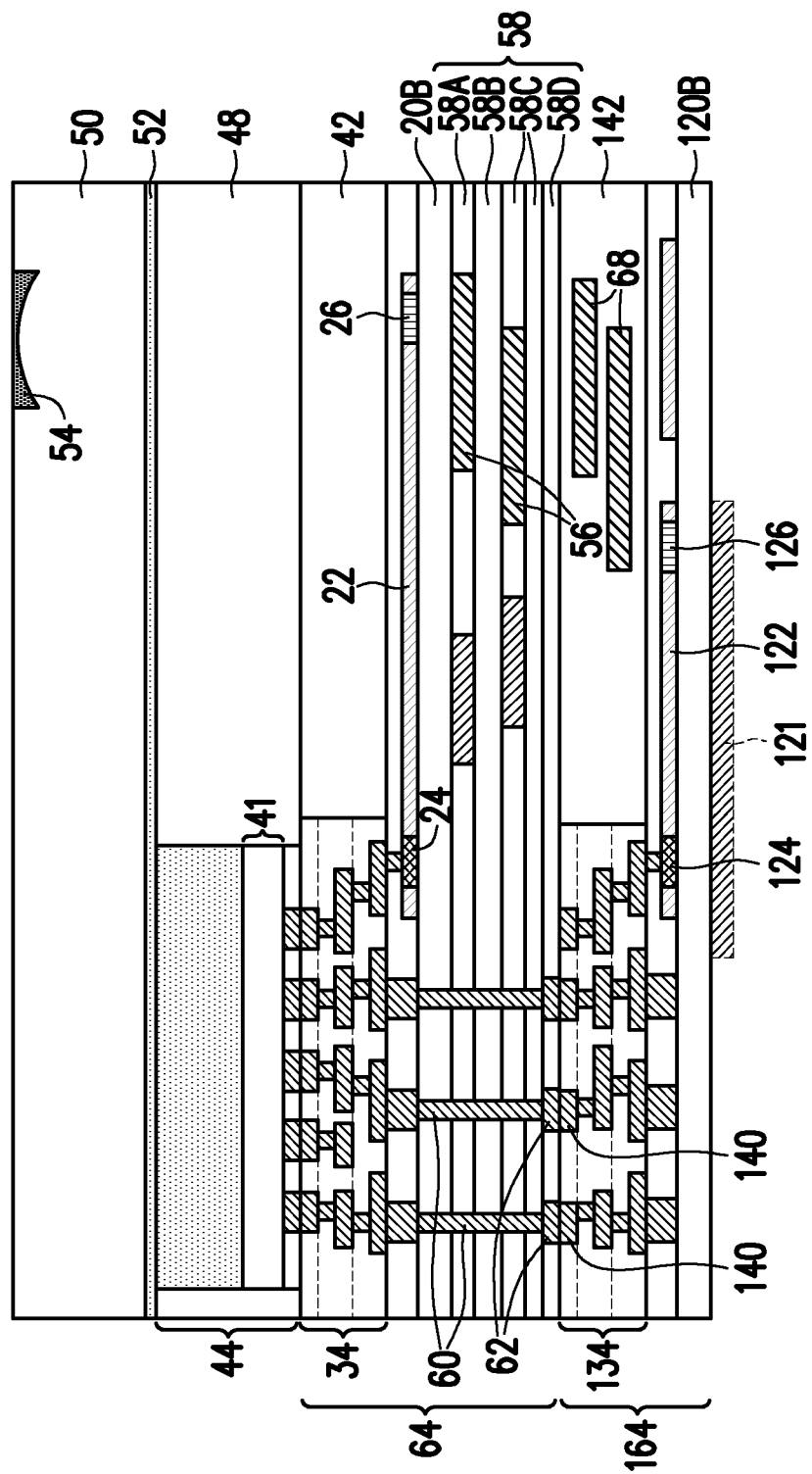

Next, as shown in FIG. 15, photonic wafer 164 is bonded to photonic wafer 64. The respective process is illustrated as process 226 in the process flow 200 as shown in FIG. 47. The bonding may be performed through hybrid bonding, with the bond pads 140 in photonic wafer 164 being bonded to bond pads 62 in photonic wafer 64, and dielectric layer 58D bonding to a surface dielectric layer in photonic wafer 164, and to dielectric layer 142.

Next, in accordance with some embodiments, bulk silicon substrate 120A is thinned, and then patterned, forming silicon features 121, which may include silicon waveguides, grating couplers, photonic components, or the like. In accordance with alternative embodiments, after the bonding, bulk silicon substrate 120A is fully removed, and oxide layer 120B may be thinned. The respective process is illustrated as process 228 in the process flow 200 as shown in FIG. 47. Accordingly, in FIG. 15, silicon features 121 are illustrated as being dashed to indicate that silicon features 121 may be, or may not be, formed.

Figure 16:
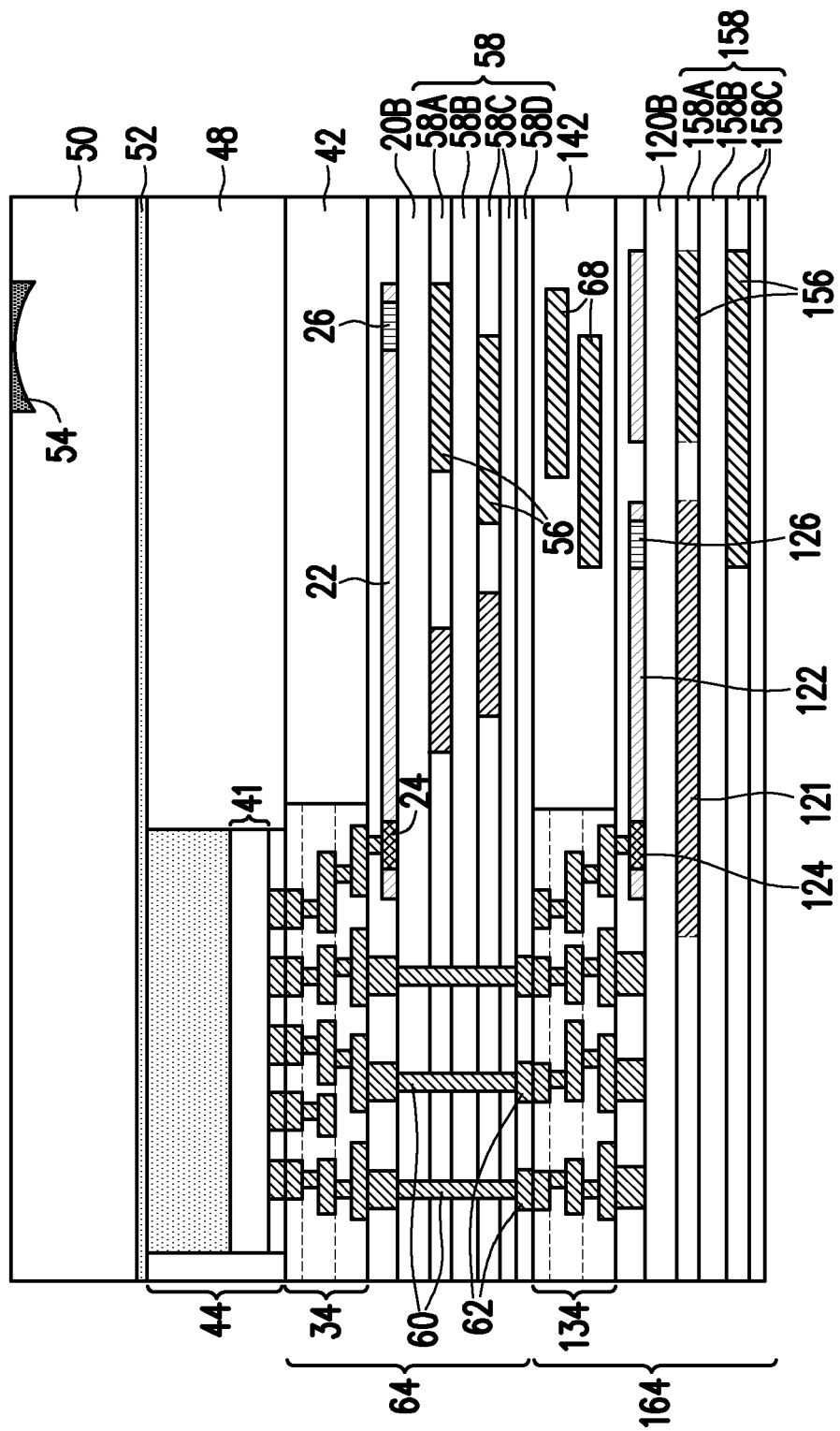

FIG. 16 illustrate the formation of more nitride waveguides 156 and dielectric layers 158 (including 158A, 15813, 158C, and 158D). The respective process is illustrated as process 230 in the process flow 200 as shown in FIG. 47. The material and the formation processes may be found referring to the formation of nitride waveguides 56 and dielectric layers 58.

In accordance with some embodiments in which bulk silicon substrate 120A is fully removed, some of nitride waveguide 156 are formed to physically contact oxide layer 120B. Accordingly, in FIG. 16, both of silicon features 121 and one nitride waveguide 156 are illustrated as being dashed to indicate that either silicon features 121 or nitride waveguide 156, or both, may be formed to contact oxide layer 120B.

Figure 17:
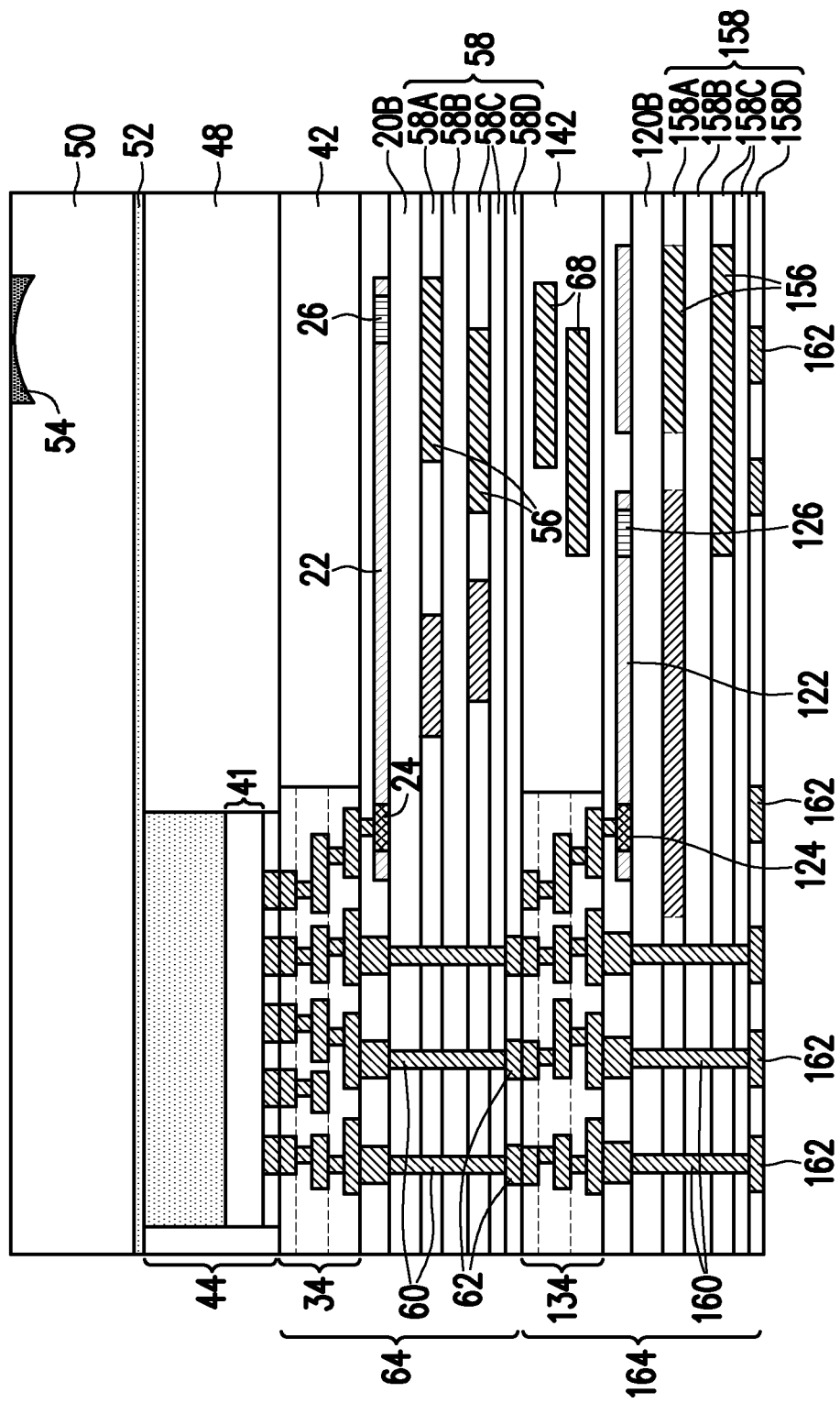

FIG. 17 illustrates the formation of through-vias 160 and bond pads 162. The respective process is illustrated as process 232 in the process flow 200 as shown in FIG. 47. The formation of photonic wafer 164 is thus finished. The formation process and the materials may be found referring to the formation process and the materials of dielectric layers 58, through-vias 60, and bond pads 62, respectively, and are not repeated herein.

Figure 18:
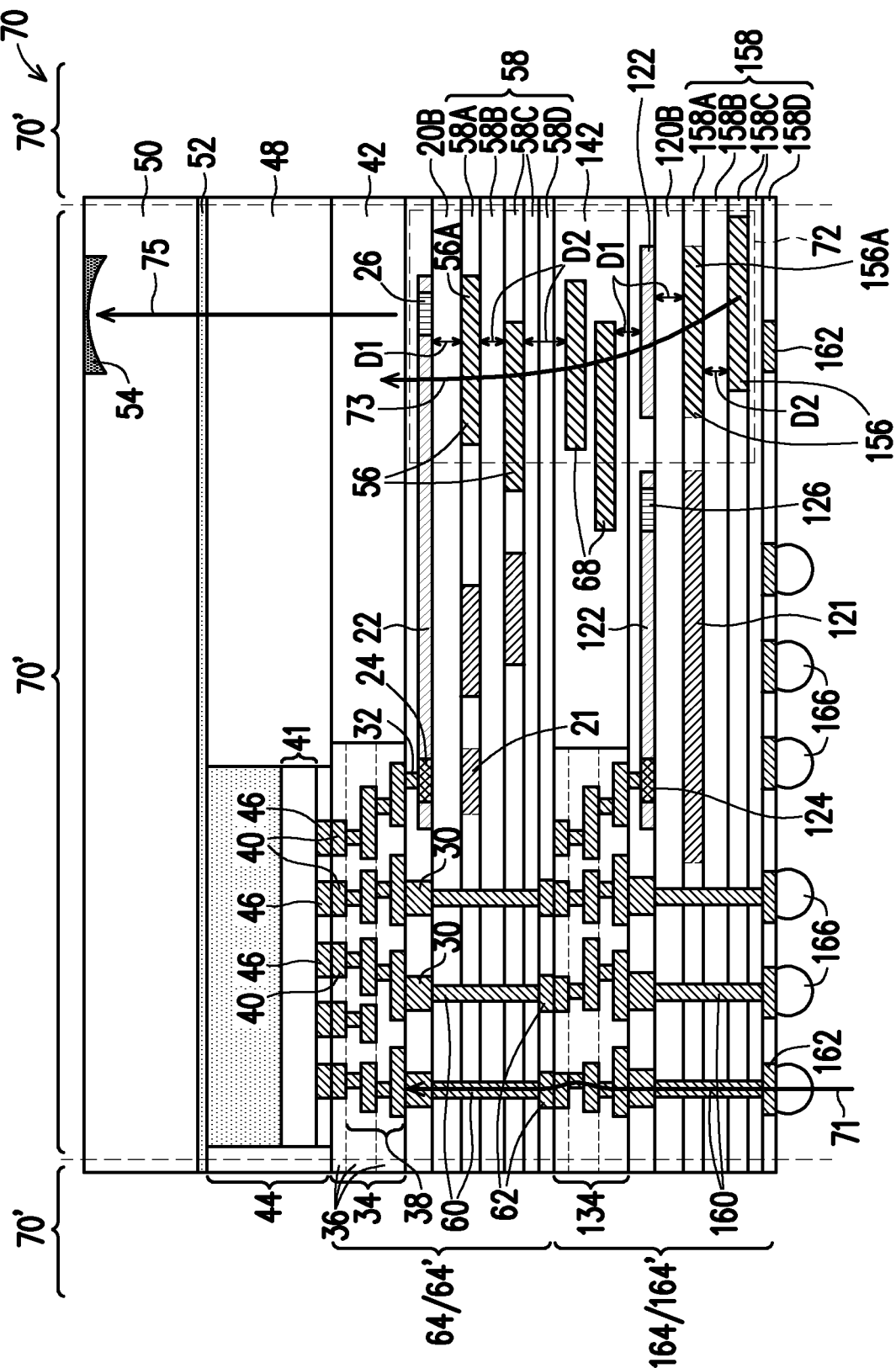

FIG. 18 illustrates the formation of electrical connectors 166, which may be formed on the bond pads 162 (which may be Under-Bump Metallurgies). The respective process is illustrated as process 234 in the process flow 200 as shown in FIG. 47. The resulting structure is referred to as photonic wafer 70. In accordance with some embodiments, in addition to the illustrated photonic wafers 64 and 164, there is one or a plurality of photonic wafers stacked between photonic wafers 64 and 164, and the processes for forming and stacking the additional photonic wafers are similar to the processes shown in FIGS. 14 through 17. In a subsequent process, a singulation process is performed to saw photonic wafer 70 apart, and to form discrete photonic dies 70', which are identical to each other. Each of photonic dies 70' includes one or more electronic die 44, and further includes one of photonic dies 64' in photonic wafers 64 and one of photonic dies 164' in photonic wafer 164. In subsequent processes, photonic packages 70' are further packaged. For example, an optical fiber (not shown) may be attached to and aligned to micro lens 54.

In photonic package 70', electronic die 44 is bonded stacked photonic dies 64', 164', and the like. There are a plurality of electronic conductive paths, which are for conducting electrical currents and signals. The electronic conductive paths connect electronic die 44, and extend to the bottom of photonic package 70'. For example, arrow 71 is drawn to represent one of the electrical conductive paths, which includes through-vias 60 and 160 and the corresponding bonding pads, and the redistribution lines in redistribution structures 34 and 134.

Photonic package 70' further includes optical through-via 72, which includes silicon waveguides 22, 122, and nitride waveguides 56 and 156, and possibly silicon waveguides 21, 121, and 68. When the horizontal distance between neighboring silicon waveguides 22, 122, and nitride waveguides 56 are small, for example, when there is overlapping, and also when the vertical distances D1 and D2 between neighboring silicon waveguides 22, 122, and nitride waveguides 56 are small, light may optically inter-couple between neighboring silicon waveguides 22, 122, and nitride waveguides 56. Accordingly, the light in the bottom nitride waveguide 56 may be coupled to the overlapping silicon waveguides 22, 122 (and possibly silicon waveguides 21, 121, and 68), and nitride waveguides 56 and 156 through the light path marked by arrow 73. Although FIG. 18 illustrates that silicon waveguides 21 and 121 are outside of the light paths 73, silicon waveguides 21 and/or 121 may also be formed in the position of the corresponding nitride waveguides 56A and/or 156A to form parts of the light path 73. The optical through-via 72 may also include silicon features 68 when they are formed in light path 73.

Light may also be emitted by grating coupler 26 to micro lens 54, and to an overlying optical fiber (not shown), and the corresponding light is shown as light beam 75. Accordingly, silicon waveguides 22, 122, nitride waveguides 56 and 156, and possibly silicon features 21, 121, and/or 68 in the light path 73, are collectively referred to as optical through-via 72, which may extend into two or more photonic die 64'/164'.

To effectively inter-couple light, the neighboring silicon waveguides 22, 122, and nitride waveguides 56 in an optical through-via 72 have small distances to achieve effective optical-coupling and low light loss. For example, the vertical distance D1 between a silicon waveguide 22/122 and its neighboring nitride waveguides 56 may be smaller than about 2,000 Å, and the vertical distance D2 between neighboring nitride waveguides 56 may be smaller than about 2 μm. Also, for effective light transferring, all materials in the light paths including dielectric layers 58 and 158 and oxide layers 20B and 120B, 142, etc., may be light-transparent, and may have light refractive index smaller than that of silicon nitride. For example, some or all of these dielectric layers may be formed of or comprise silicon oxide.

Figure 19:
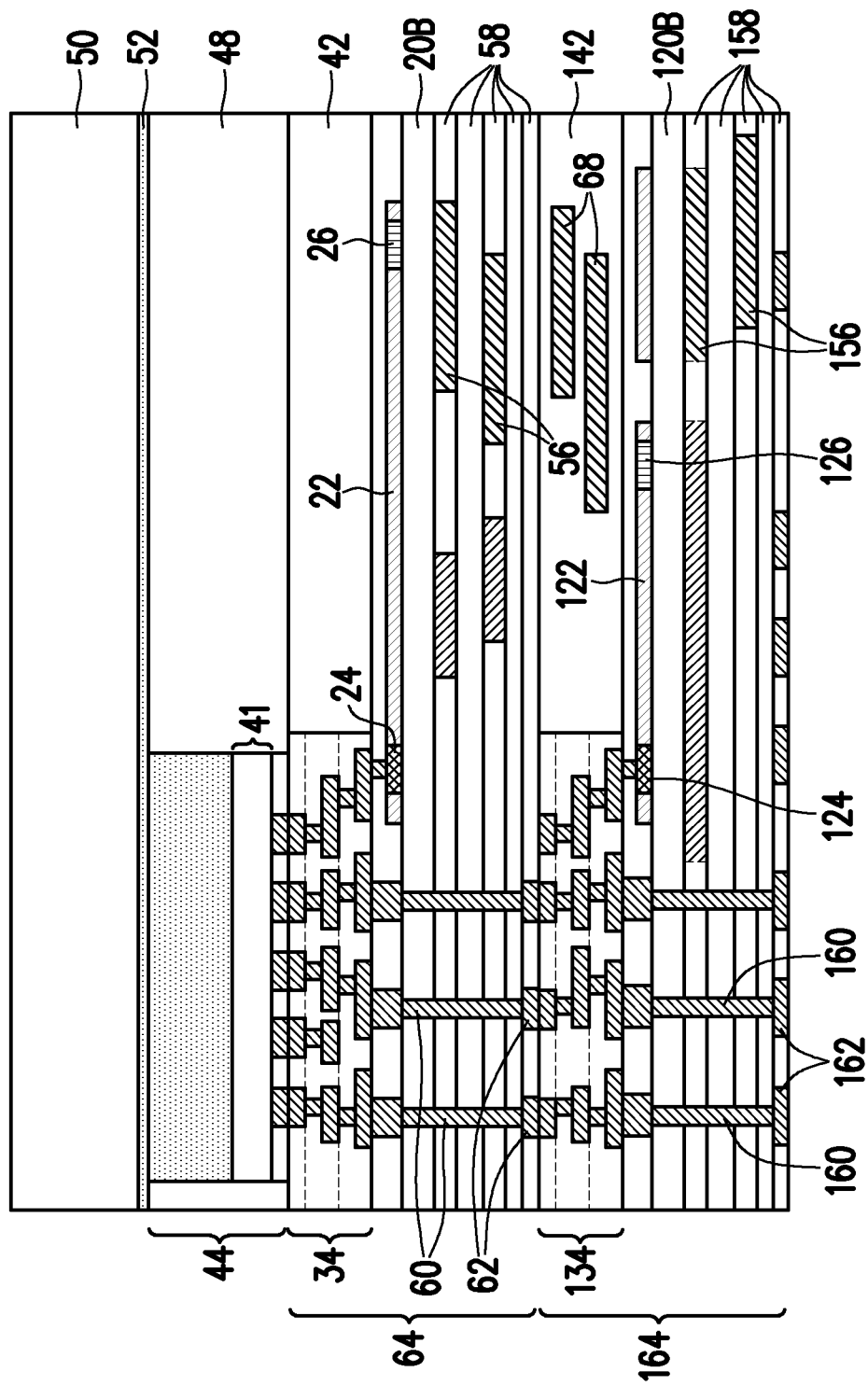
FIGS. 19-24 illustrate the cross-sectional views of intermediate stages in the formation and integration of a package including stacked photonic dies with an optical device in accordance with some embodiments.

FIGS. 19 through 24 illustrate the cross-sectional views of intermediate stages in the formation of a photonic package and the integration of a photonic component in accordance with some embodiments of the present disclosure. Unless specified otherwise, the materials and the formation processes of the components in these embodiments are essentially the same as the like components, which are denoted by like reference numerals in the preceding embodiments shown in FIGS. 1-5, 6A, 6B, and 7-18. The details regarding the formation process and the materials of the components shown in FIGS. 19-24 (and the embodiments in FIGS. 25-31, 32-43, 44 and 45) may thus be found in the discussion of the preceding embodiments. The initial steps of these embodiments are essentially the same as shown in FIGS. 1-5, 6A, 6B, and 7-17, and the resulting structure is shown in FIG. 19.

Figure 20:
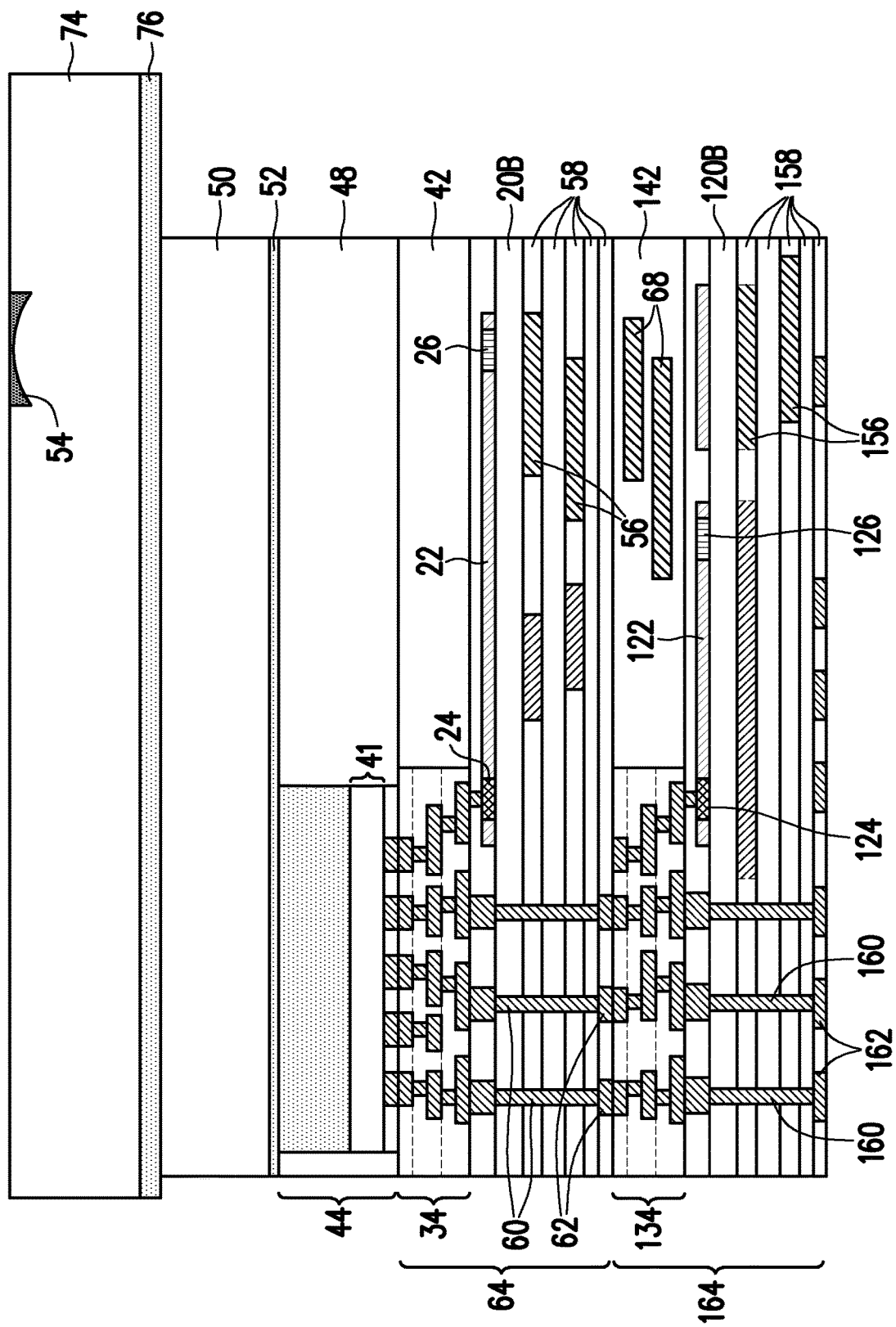

FIG. 20 illustrates the bonding of supporting substrate 74. In accordance with some embodiments, a silicon-containing dielectric layer 76, which may comprise silicon oxide, silicon oxynitride, silicon carbo-nitride, or the like, is used to bond supporting substrate 74 to supporting substrate 50. In accordance with alternative embodiments, supporting substrate 50 and the dielectric layer 52 are not adopted, and supporting substrate 74 and dielectric layer 76 are bonded directly to electronic die 44 and gap-filling material 48. The bonding may be performed through dielectric-to-dielectric bonding, with Si—O—Si bonds formed. There may be a micro lens 54 formed in supporting substrate 74. In accordance with some embodiments, supporting substrate 74 is or comprises a silicon substrate, a glass substrate, or the like.

Figure 21:
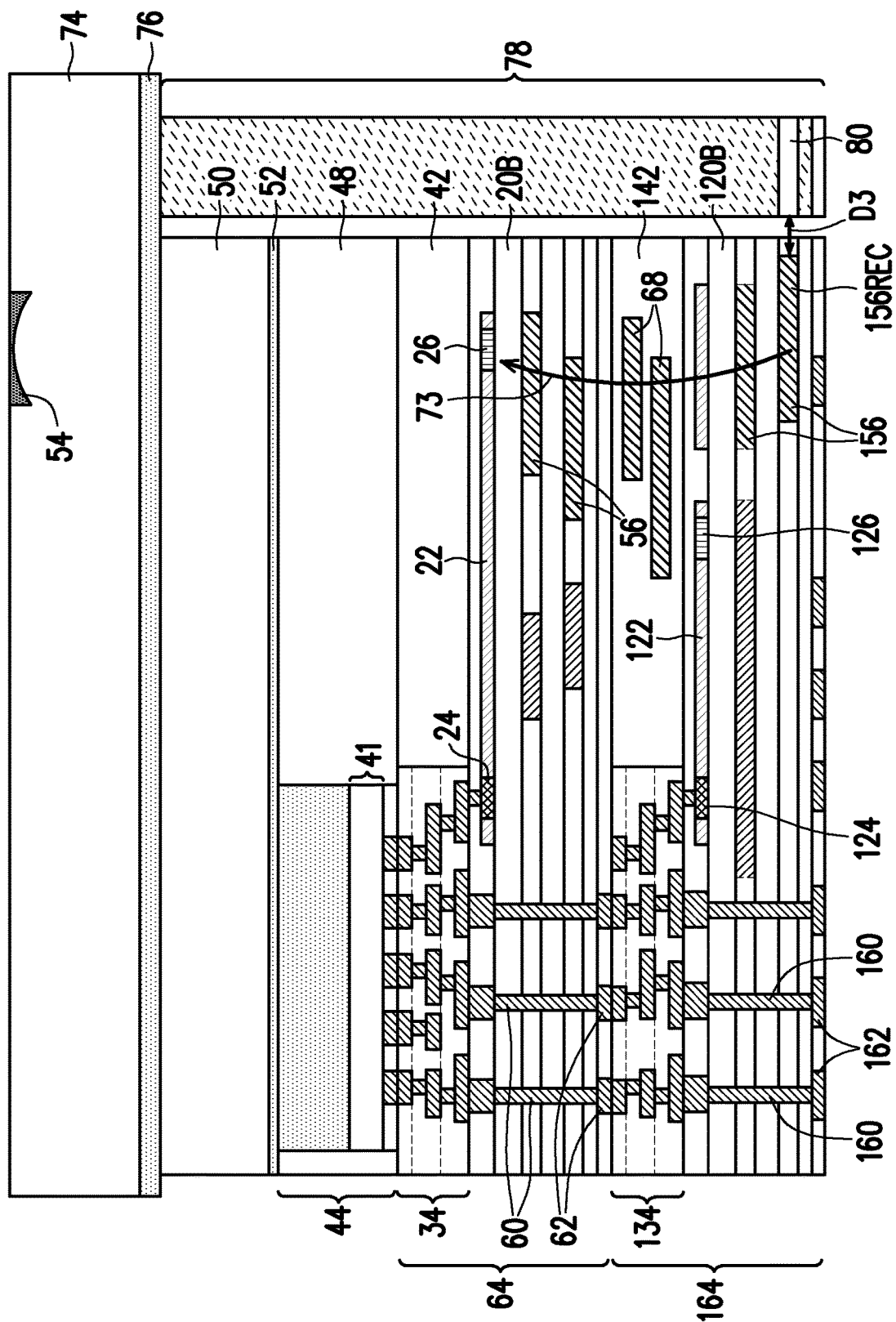

Referring to FIG. 21, photonic component 78 is attached to supporting substrate 74 (for example, to dielectric layer 76). The adhesion may be achieved through fusion bonding, adhesive bonding, solder bonding, or the like. In accordance with some embodiments, photonic component 78 is a photo diode (such as a laser diode), which may be formed of or comprise a III-V semiconductor material. In accordance with some embodiments, photonic component 78 is configured to receive an electrical signal, and emit a light beam (such as laser beam). The light-emitting region 80 may be horizontally aligned to one of nitride waveguides 156 (denoted as 156REC), which receives the light beam emitted by light-emitting region 80, and transfers the light upwardly along light path 73. In accordance with some embodiments, the lateral distance D3 between the light-emitting region 80 and the light-receiving nitride waveguide 156REC is small, for example, smaller than about 300 nm, and may be in the range between about 200 nm and about 300 nm.

Figure 22:
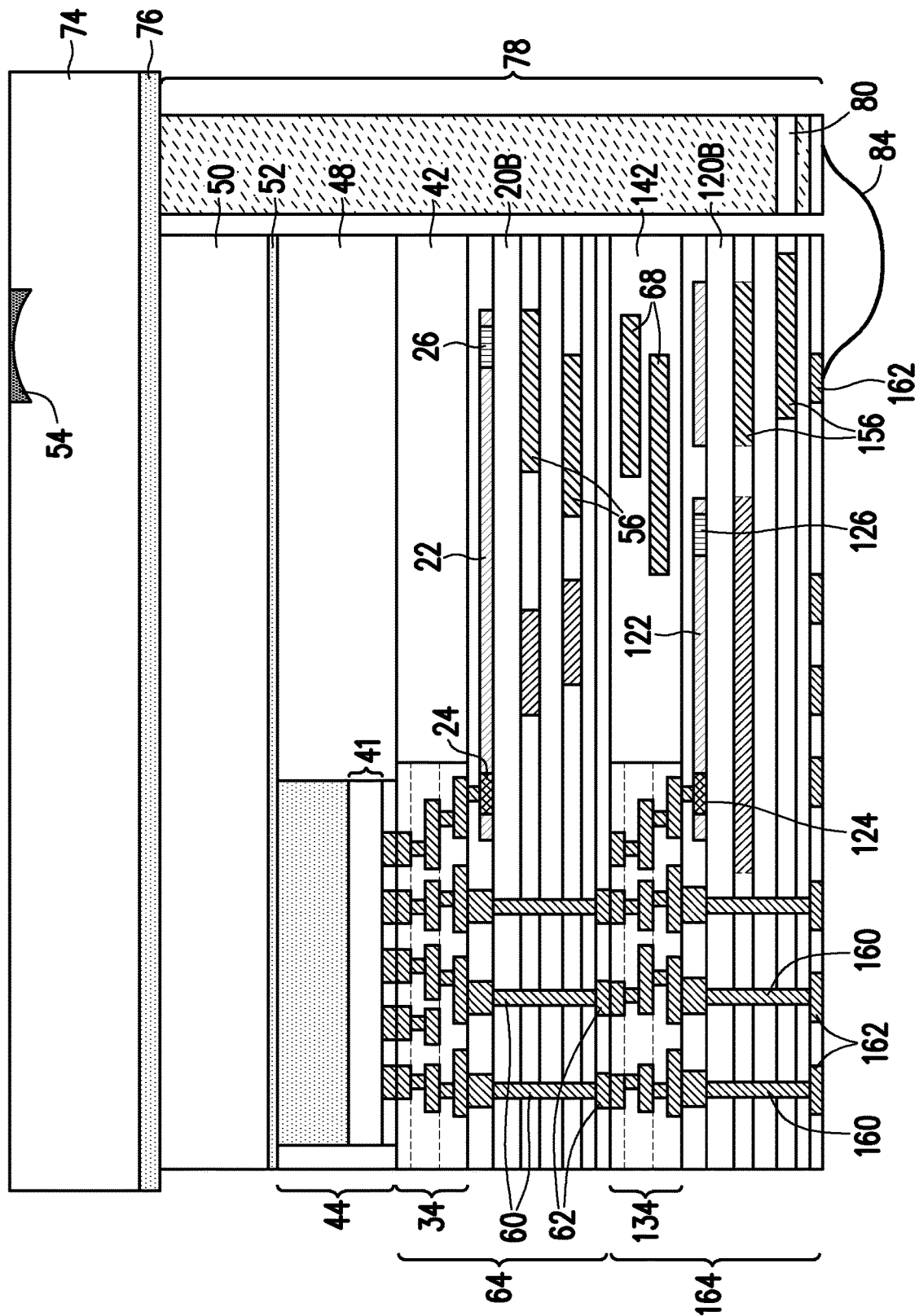
Figure 23:
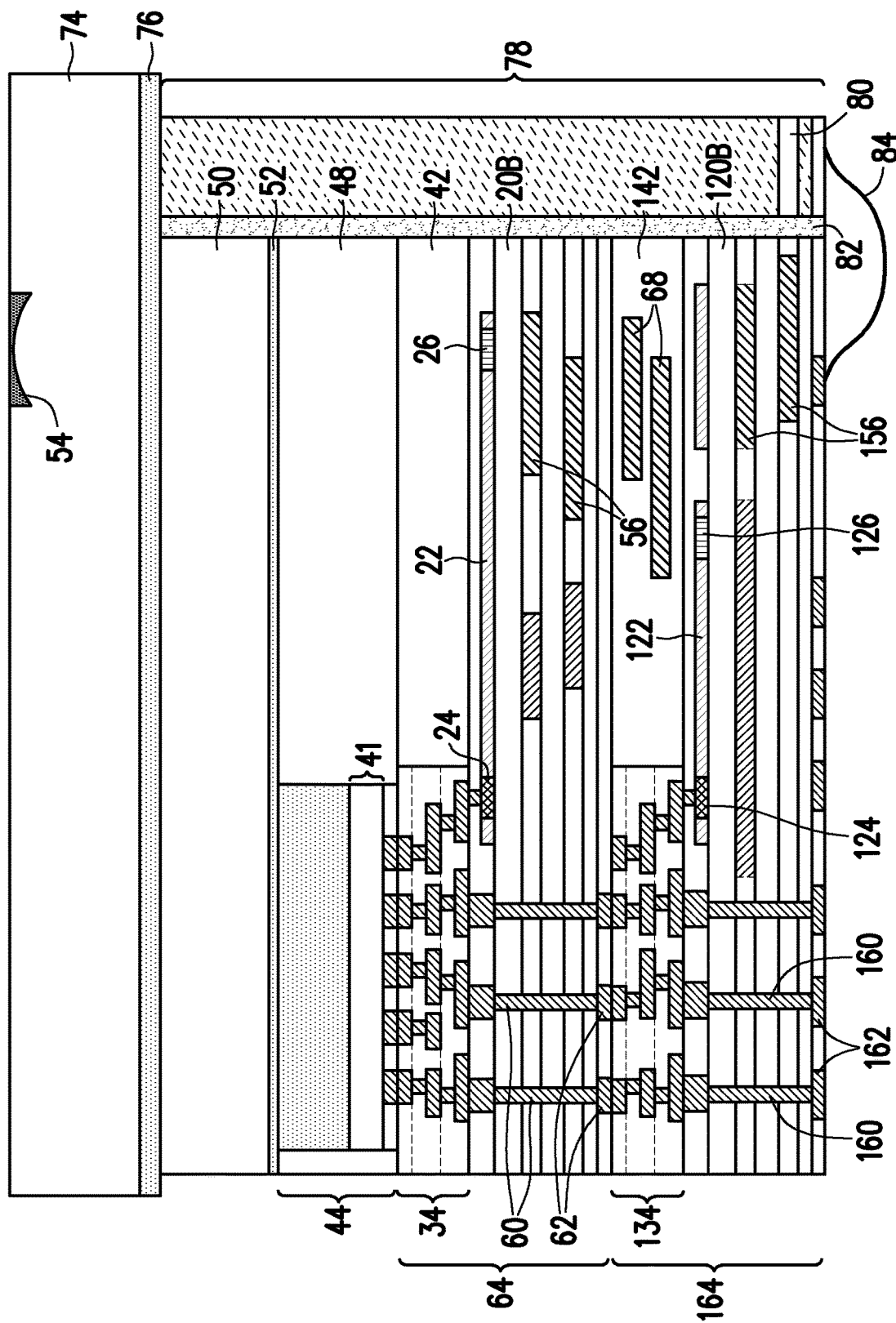
Figure 24:
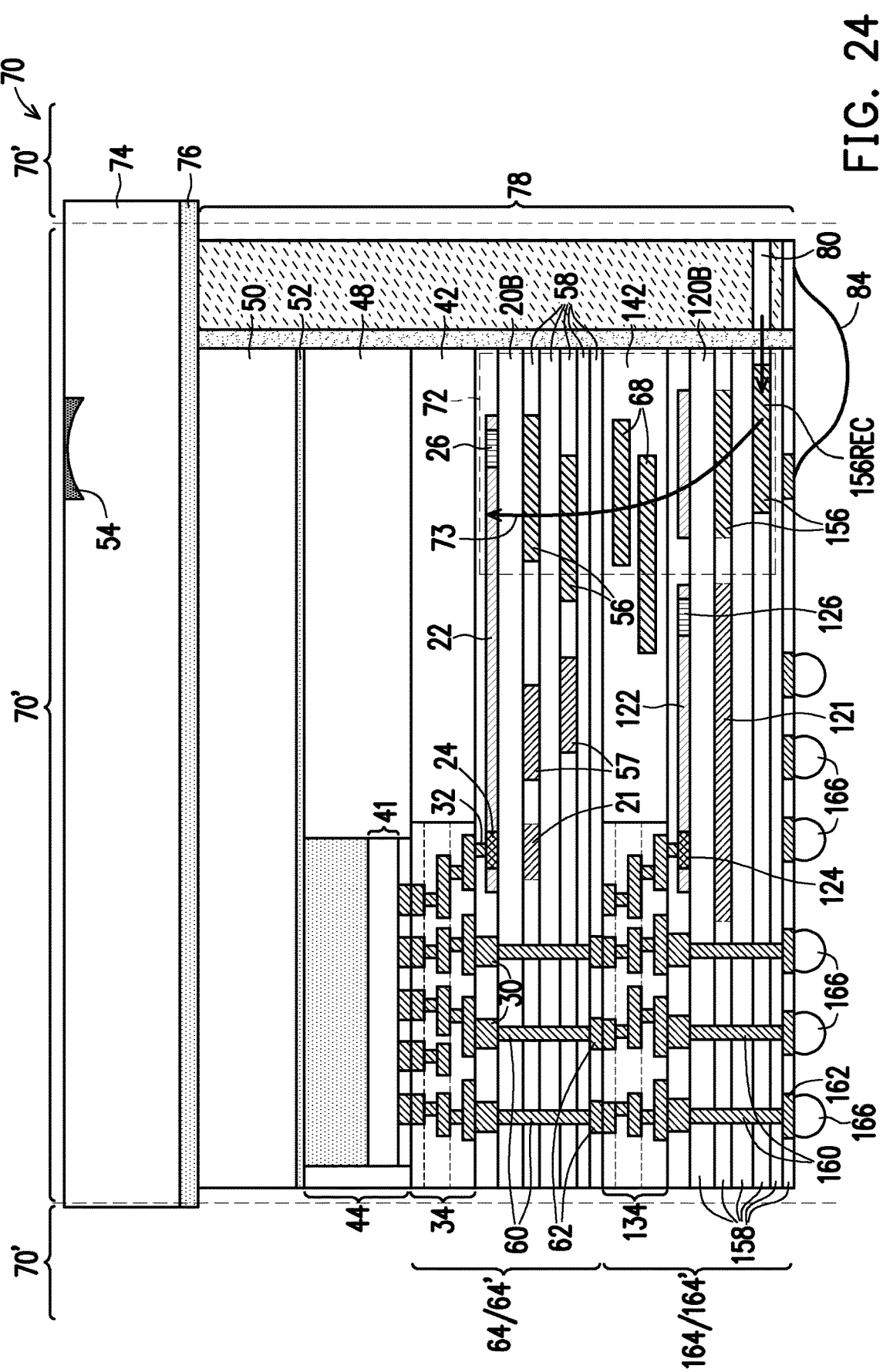

FIGS. 22 and 23 illustrates the formation of bond wire 84 and the filling of optical glue 82, which is transparent to the light emitted by photonic component 78, so that photonic component 78 is fixed. The order of the formation of bond wire 84 and the filling of optical glue 82 may also be inversed. Photonic component 78 may be electrically connected to one of bond pads 162 through bond wire 84. FIG. 24 illustrates the formation of electrical connectors 166, so that photonic wafer 70 is formed. In subsequent processes, a singulation process is performed to saw apart the discrete photonic packages 70' from each other.

Figure 25:
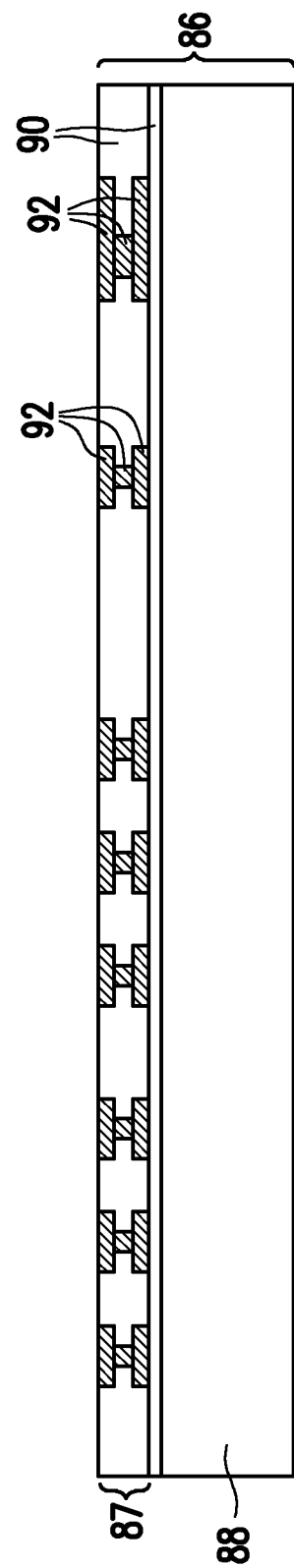
FIGS. 25-31 illustrate the cross-sectional views of intermediate stages in the formation and integration of a package including stacked photonic dies with an optical device in accordance with some embodiments.

FIGS. 25 through 31 illustrate the formation of a photonic package and the integration of a photonic component with the photonic package in accordance with alternative embodiments. Referring to FIG. 25, redistribution component 86 is formed. Redistribution component 86 includes substrate 88, and redistribution structure 87 over substrate 88. Substrate 88 may be a semiconductor substrate, a dielectric substrate, a glass carrier, or the like. Redistribution structure 87 further includes dielectric layers 90, and redistribution lines 92 in dielectric layers 90. Redistribution lines 92 may be formed through damascene processes, or through plating processes.

Figure 26:
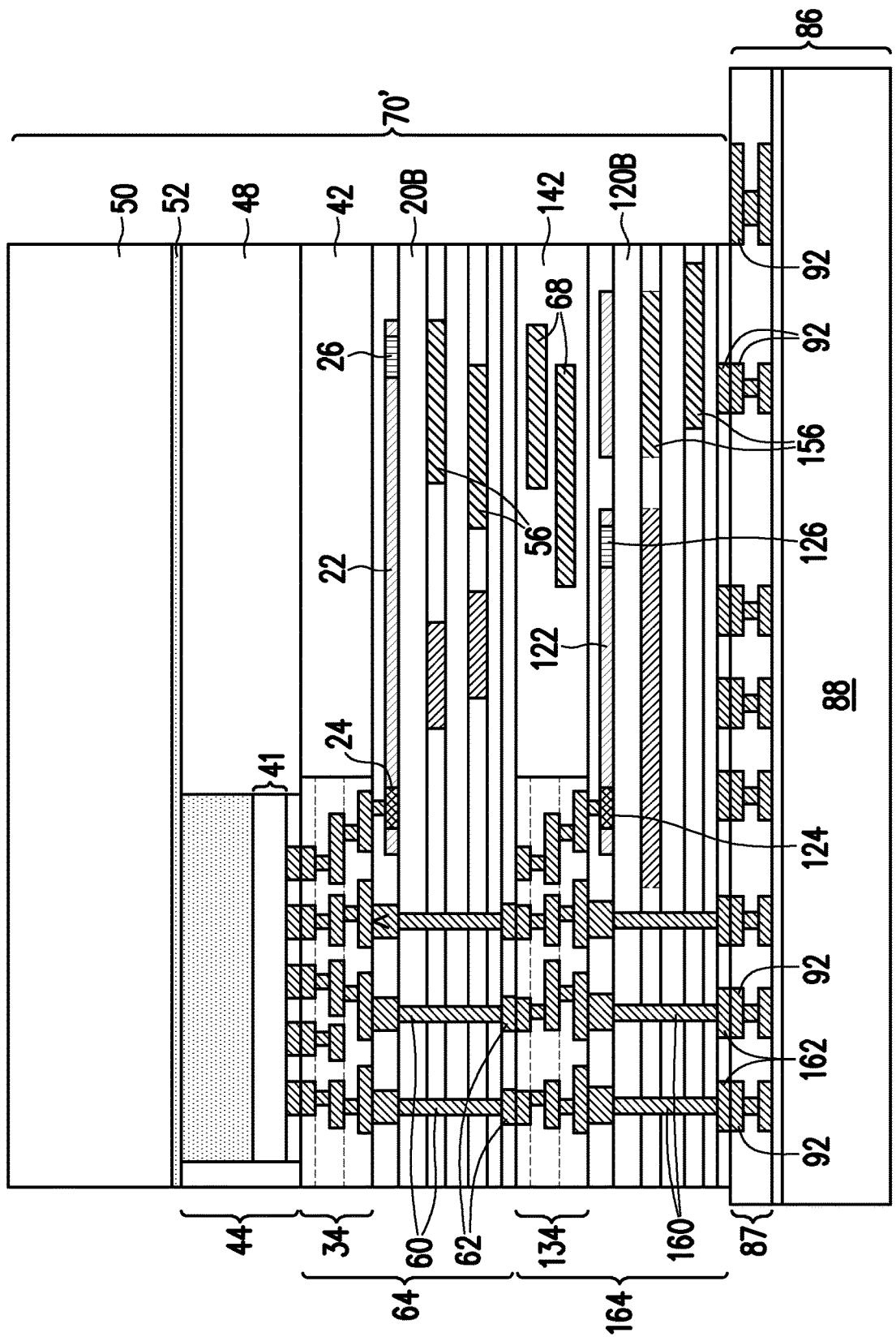
Figure 27:
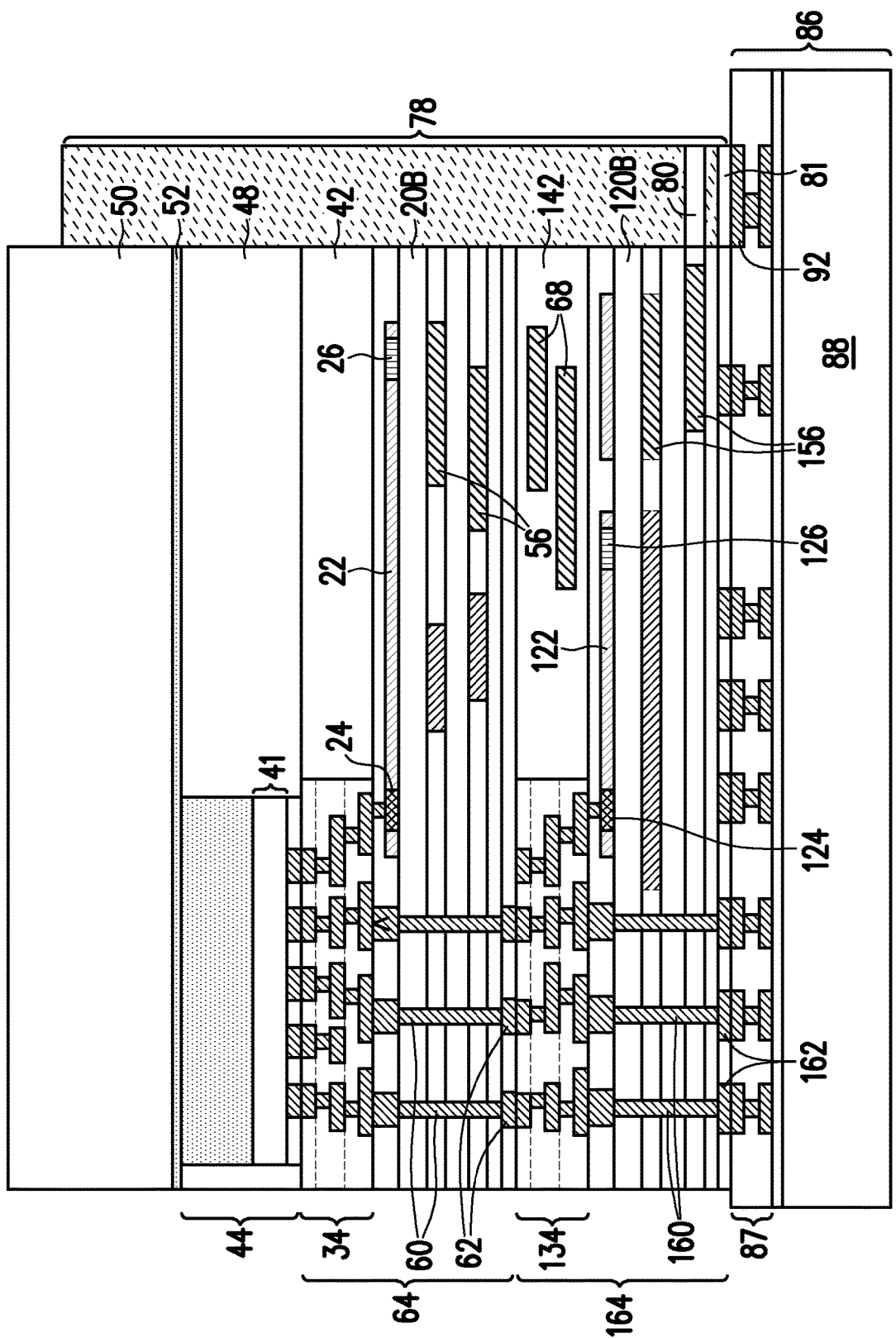

Referring to FIG. 26, photonic package 70' is bonded to redistribution component 86. The bonding may be through hybrid bonding, metal-to-metal direct bonding, or the like. Next, referring to FIG. 27, photonic component 78 is bonded to redistribution component 86. The bonding may be through metal-to-metal direct bonding, solder bonding, or the like. An electrode 81 of photonic component 78 is electrically connected to, and may be physically bonded to, a bond pad, which is a part of a redistribution line 92. Accordingly, photonic component 78 may be electrically connected to electronic die 44 through redistribution line 92 and through-vias 60 and 160. In accordance with some embodiments, photonic component 78 has its sidewall contacting the sidewall of photonic package 70'. In accordance with alternative embodiments, there is a gap (similar to FIG. 22) between photonic package 70' and photonic component 78.

Figure 28:
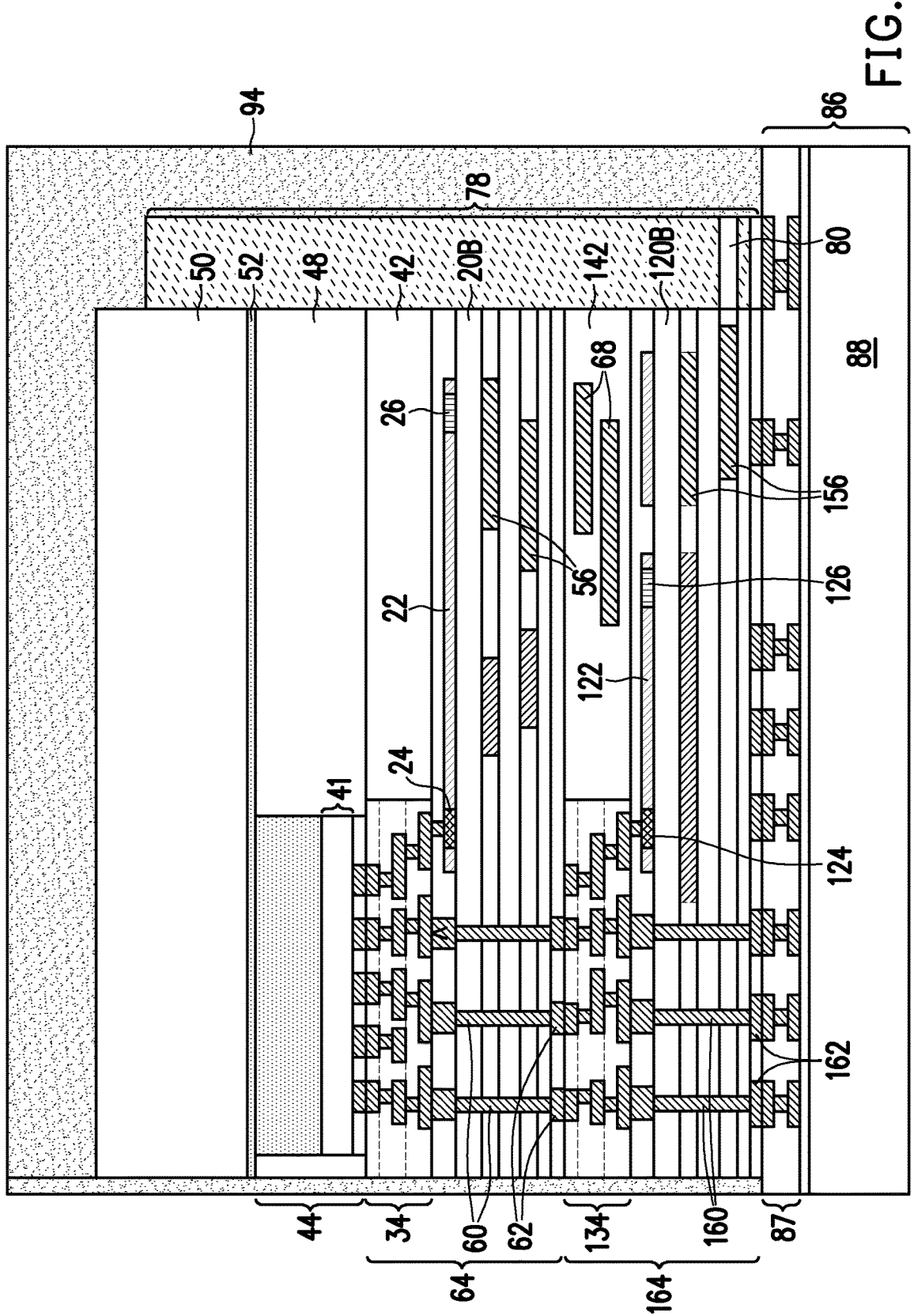

Referring to FIG. 28, encapsulant 94 is dispensed and cured. In accordance with some embodiments, encapsulant 94 comprises a molding compound. In accordance with alternative embodiments, encapsulant 94 comprises silicon oxide, silicon nitride, or the like. In a subsequent process, a planarization process such as a CMP process or a mechanical polishing process may be performed, and the resulting structure is shown in FIG. 29.

Figure 29:
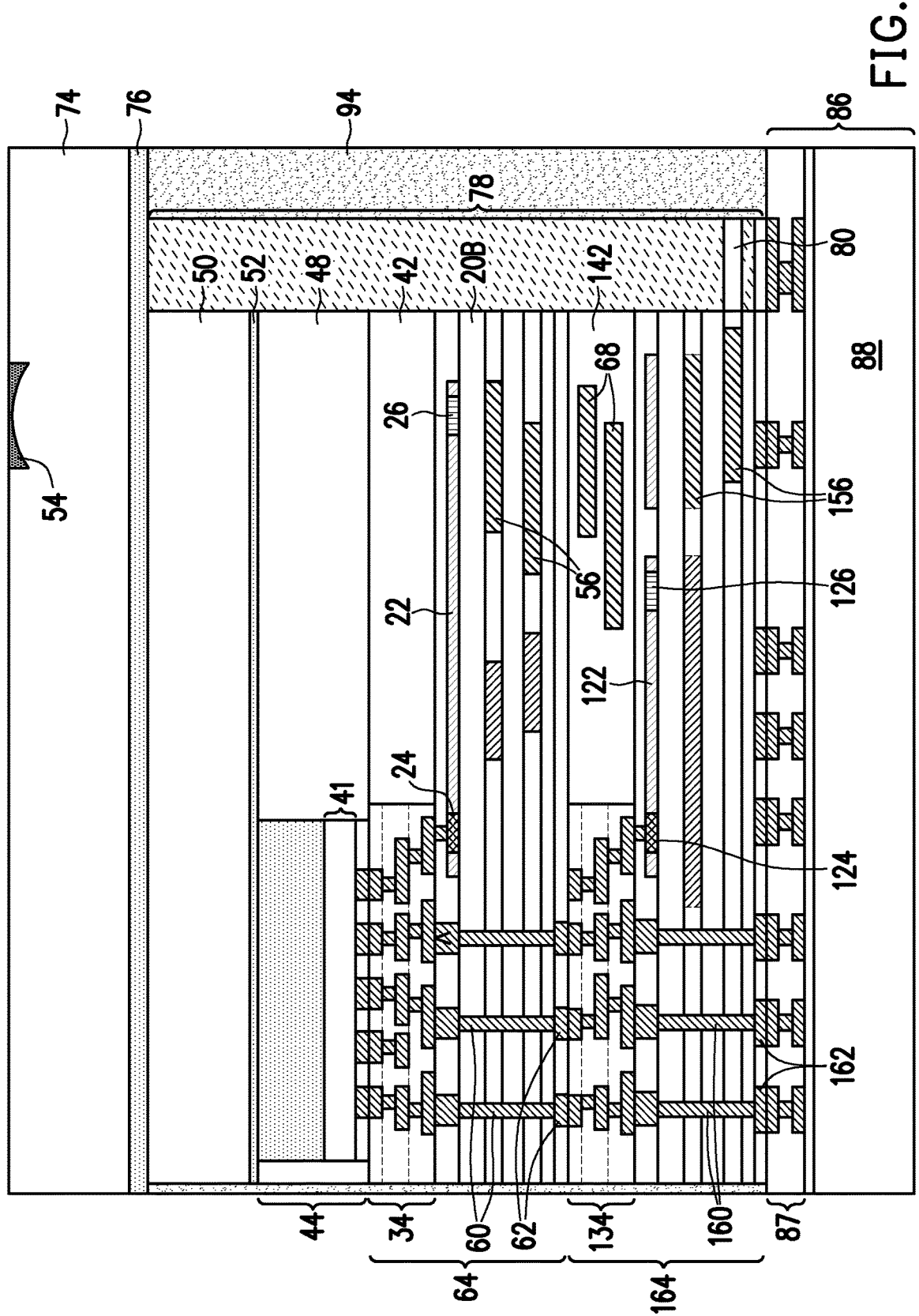

FIG. 29 further illustrates the attachment of supporting substrate 74, which may be bonded to supporting substrate 50 through fusion bonding, with dielectric layer 76 in between. Micro lens 54 may be formed in supporting substrate 74.

Figure 30:
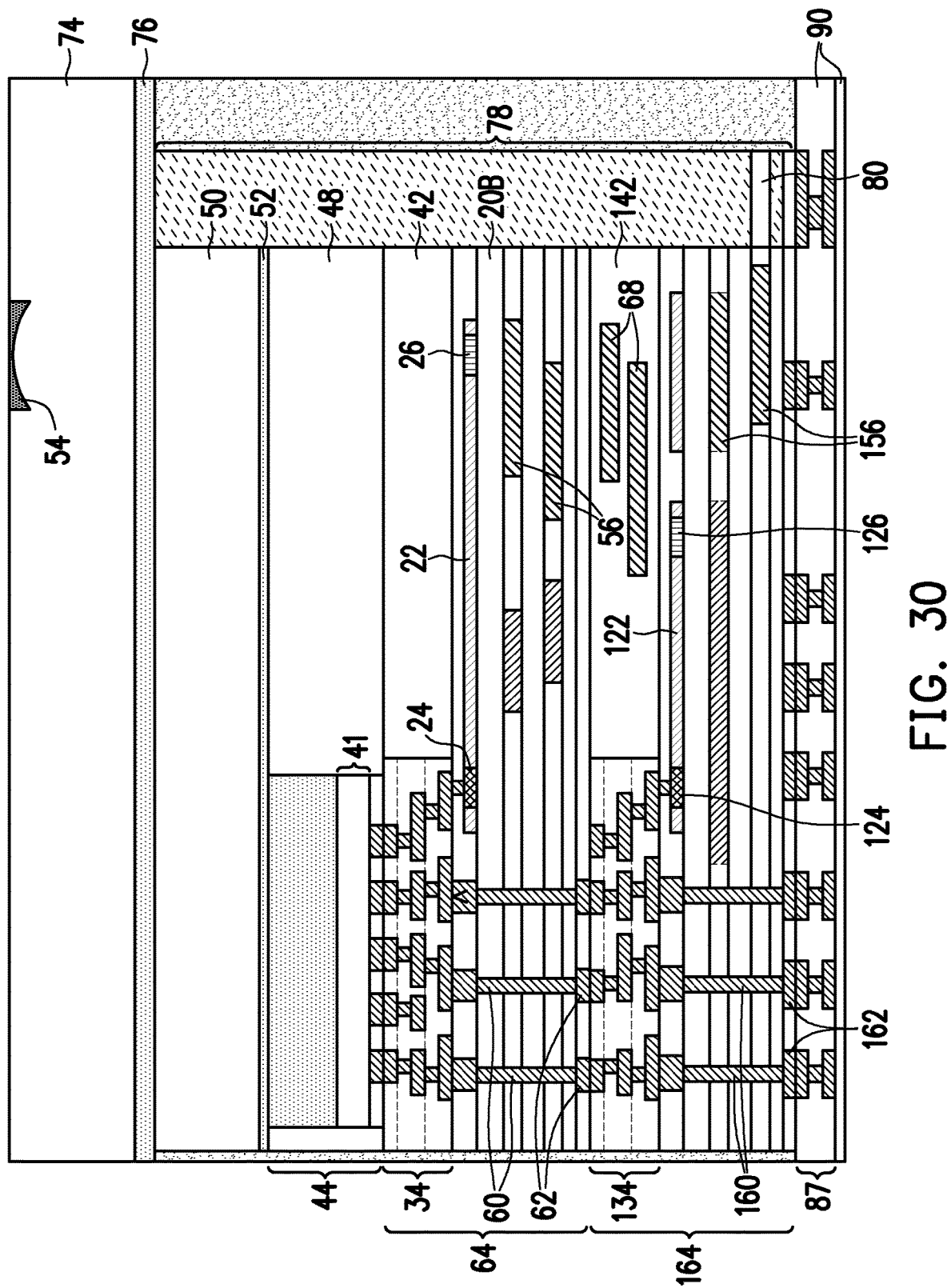
Figure 31:
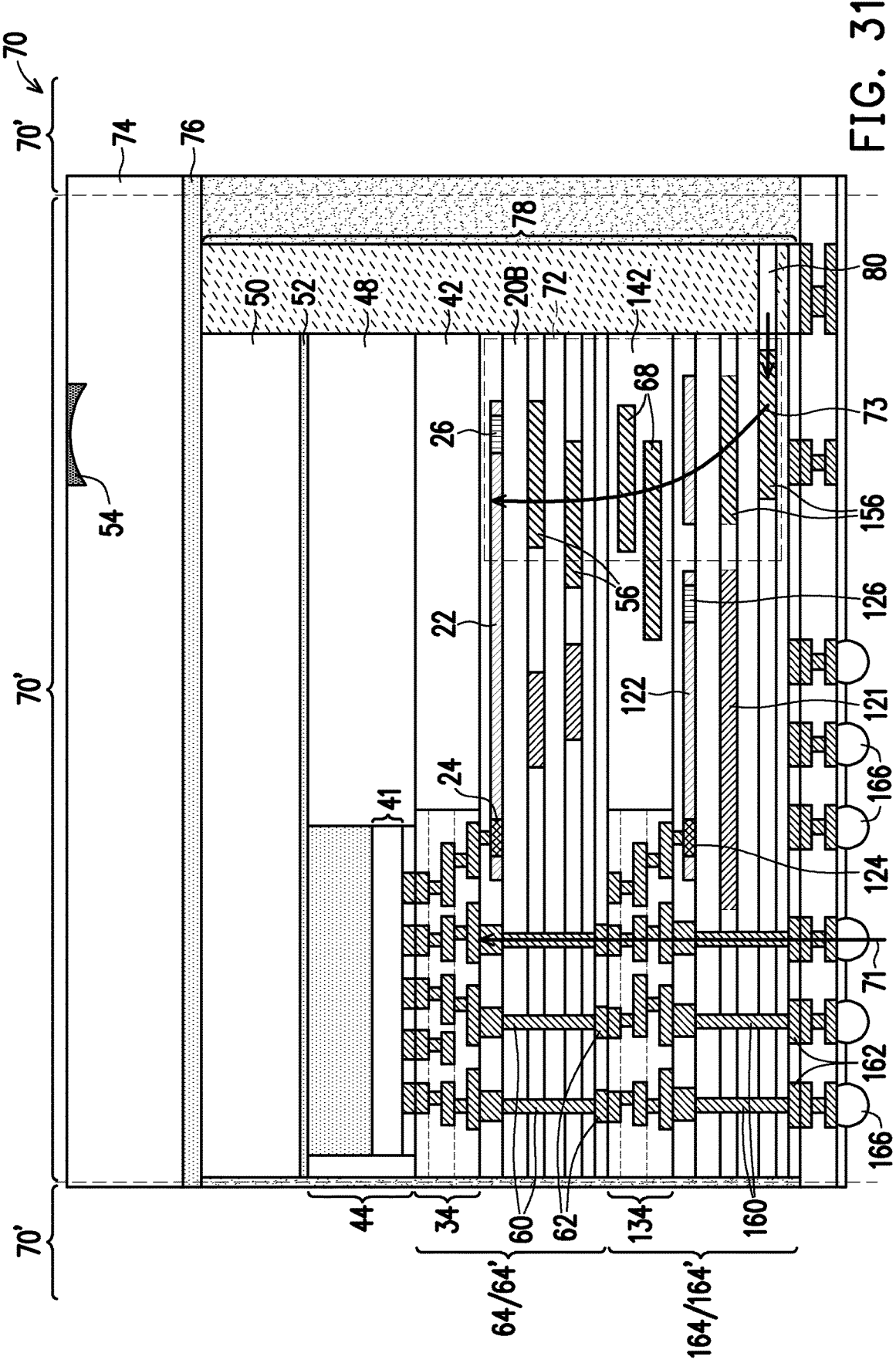

In a subsequent process, substrate 88 is removed, for example, through a CMP process, a mechanical grinding process, an etching process, or the like. The resulting structure is shown in FIG. 30. FIG. 31 illustrates the formation of electrical connectors 166, so that photonic wafer 70 is formed. Subsequently, a singulation process is performed to saw apart the discrete photonic packages 70' from each other.

Figure 32:
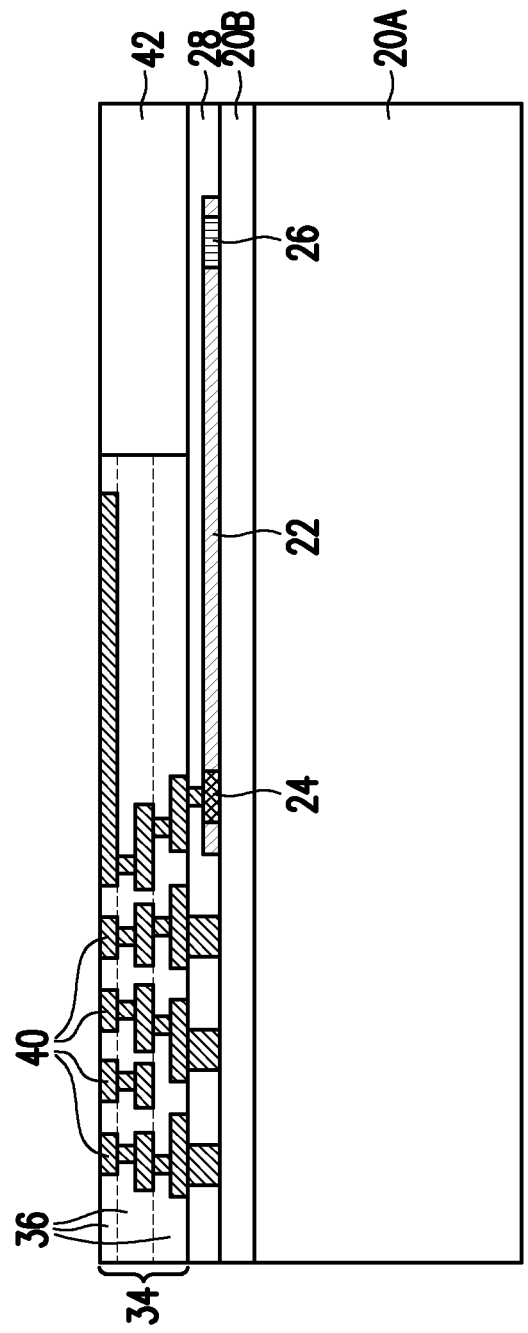
FIGS. 32-43 illustrate the cross-sectional views of intermediate stages in the formation and integration of a package including stacked photonic dies with an optical device in accordance with some embodiments.
Figure 33:
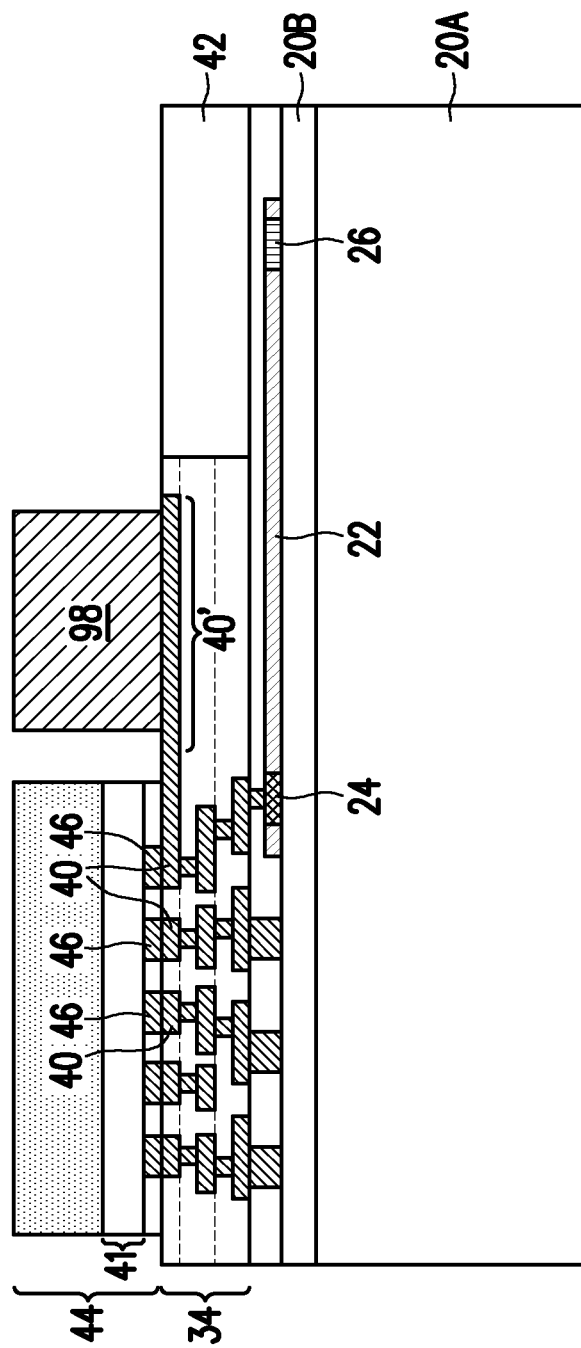

FIGS. 32 through 43 illustrate the formation of a photonic package and the integration of a photonic component with the photonic package in accordance with alternative embodiments. The initial processes are the same as what are shown in FIGS. 1 through 5, and the resulting structure is also shown in FIG. 32. Next, referring to FIG. 33, electronic die 44 is bonded to redistribution structure 34. Furthermore, thermal block 98, which has a high thermal conductivity value (for example, higher than about 1 watt/m*K), is attached to redistribution structure 34. Thermal block 98 may be a silicon block, a metal block, or the like. In accordance with some embodiments, the attachment is achieved through a thermal interface material (not shown), which adheres thermal block 98 to metal pad 40'. Metal pad 40' may be connected to one of bond pads 40, which will be bonded to electronic die 44.

Figure 34:
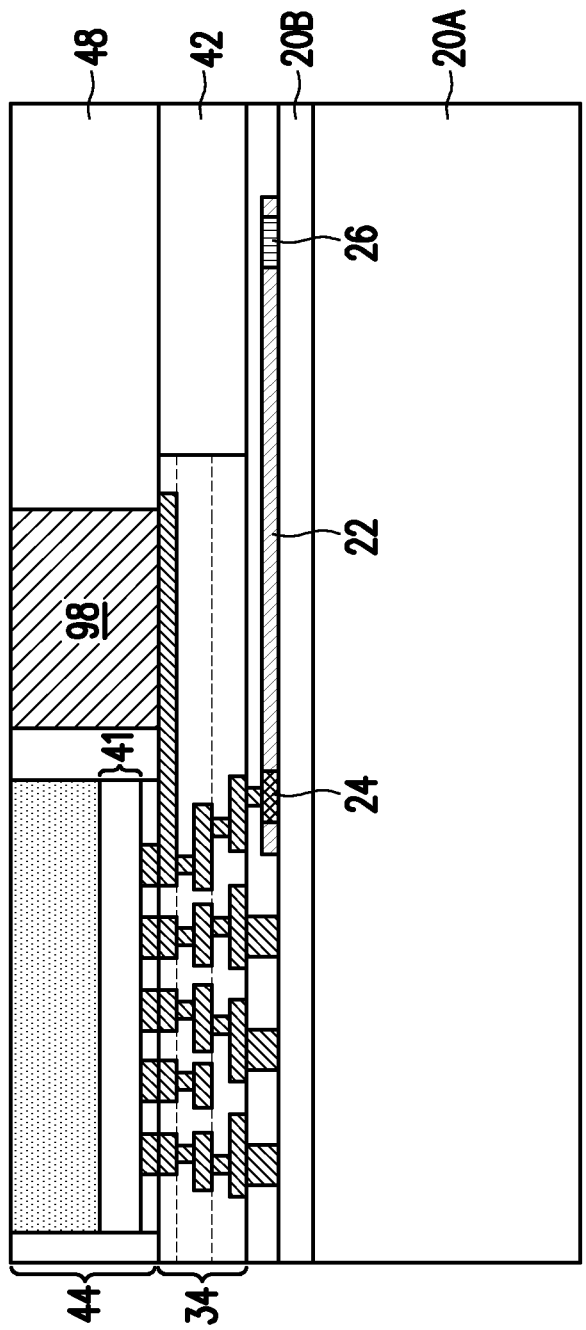
Figure 35:
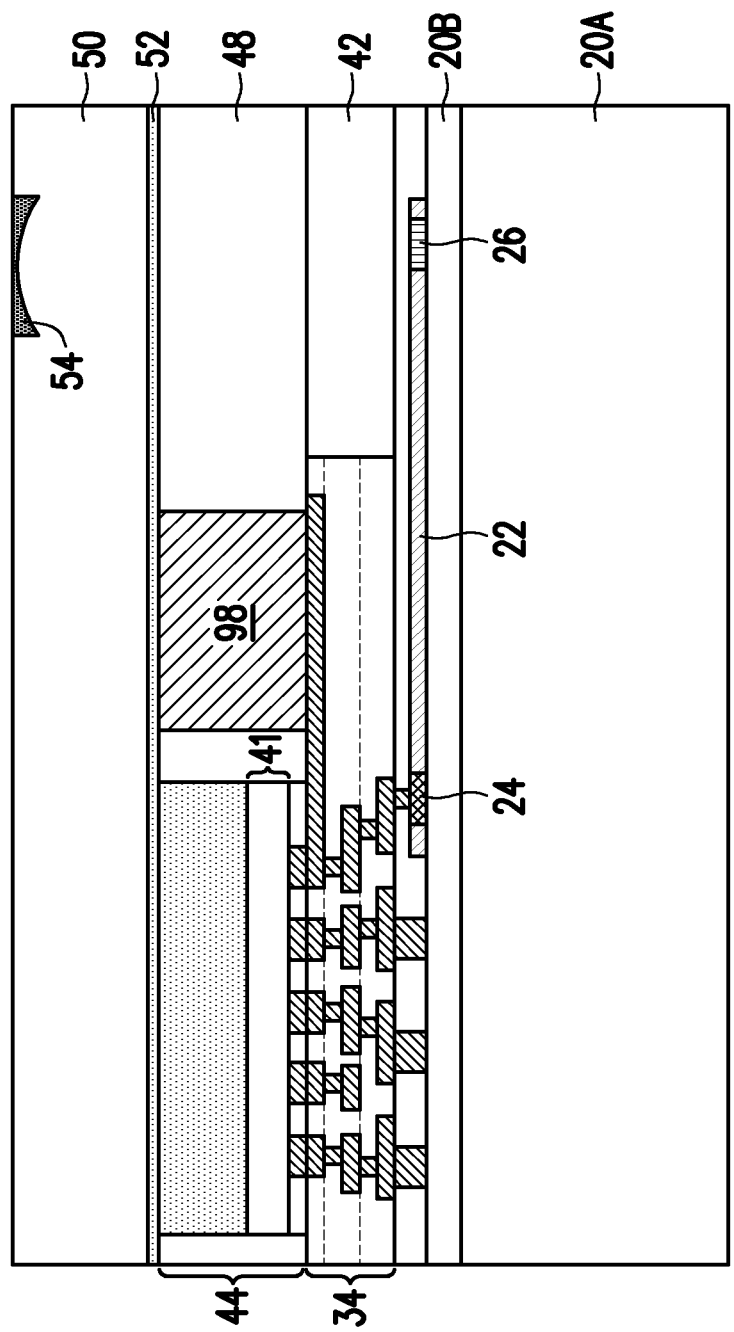
Figure 36:
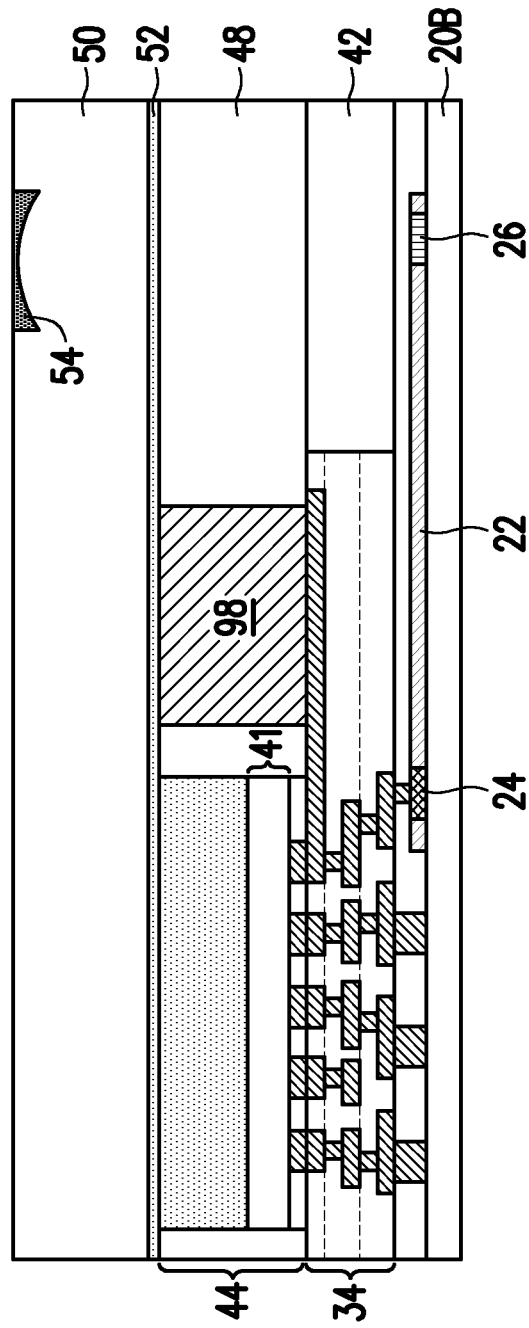
Figure 37:
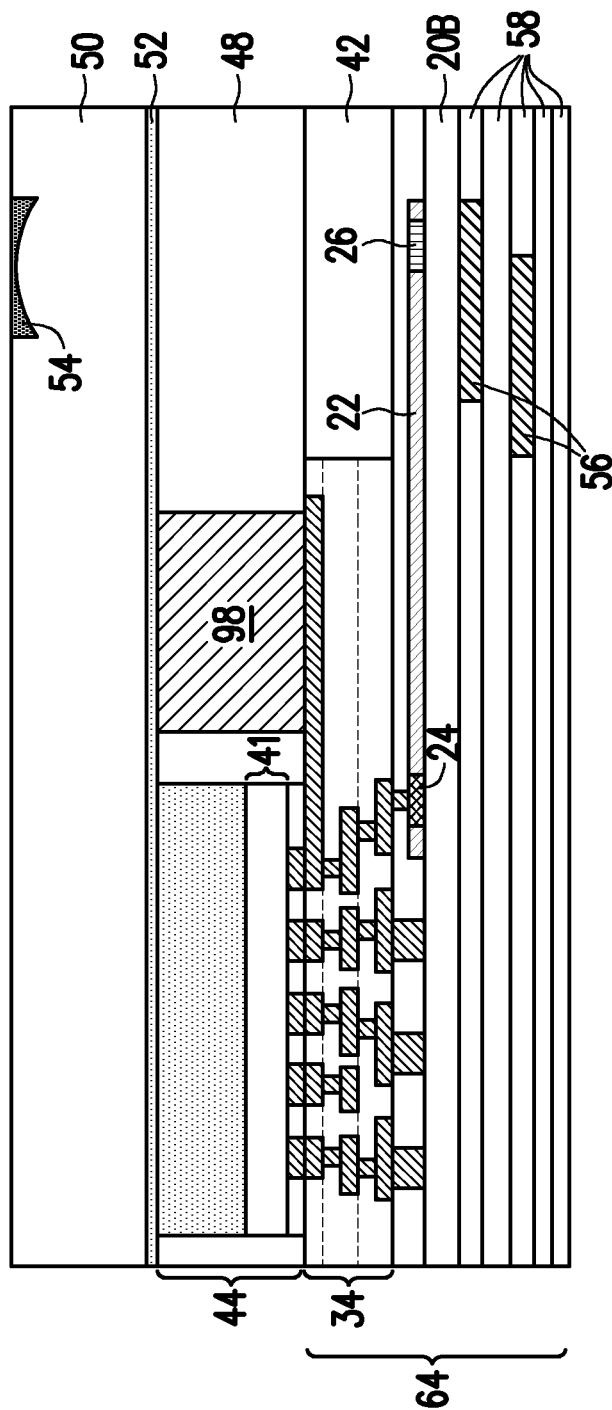
Figure 38:
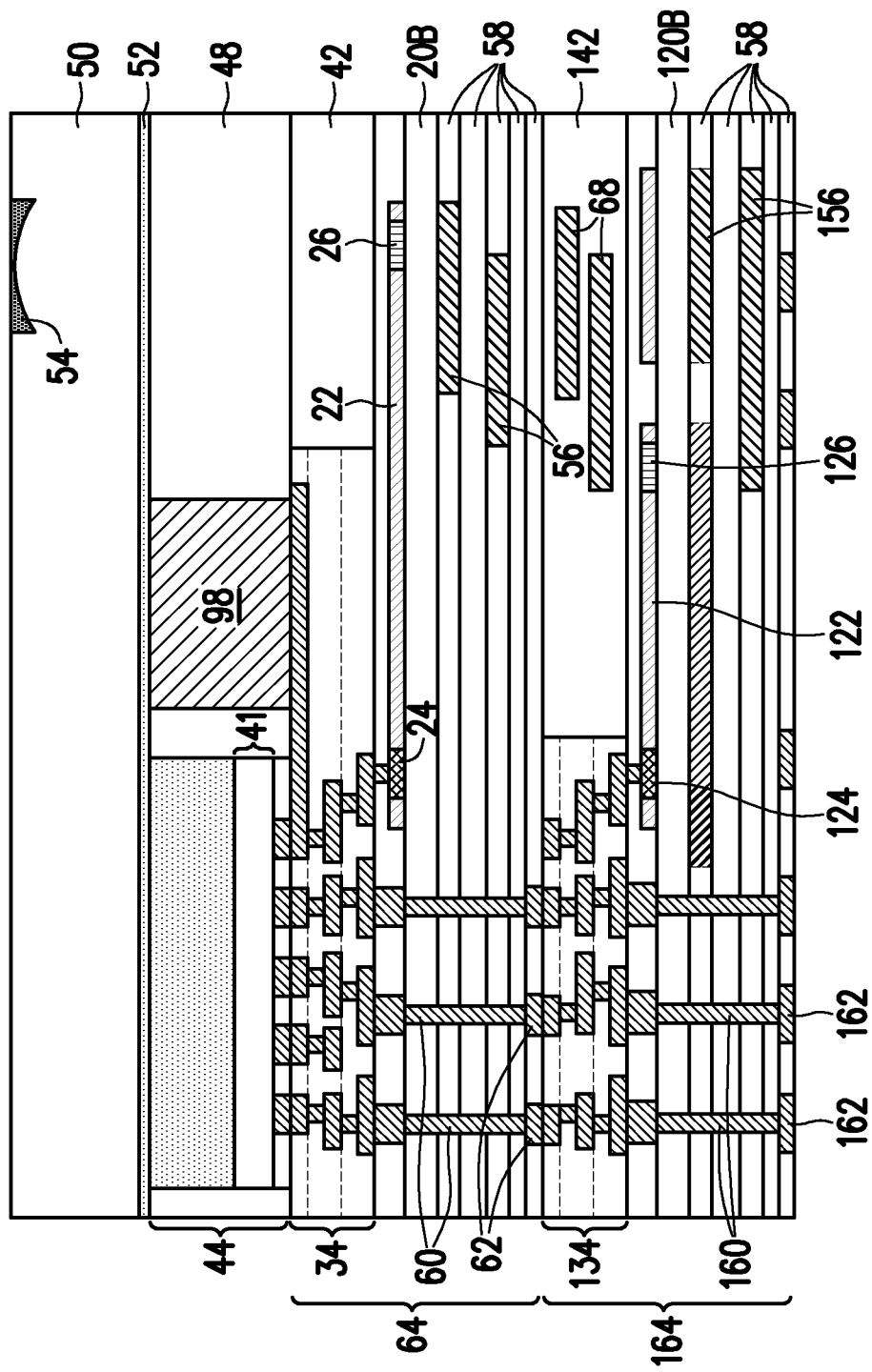

The subsequent processes as shown in FIGS. 34 through 38 are essentially the same as shown in FIGS. 7 through 17. The details of the materials and the processes are thus not discussed in detail herein. For example, as shown in FIG. 34, gap-filling material 48 is formed and planarized. FIG. 35 illustrates the attachment of supporting substrate 50. FIG. 36 illustrates the removal of bulk substrate 20A, followed by the formation of dielectric layers 58 and nitride waveguides 56 as shown in FIG. 37. FIG. 38 illustrates the formation of photonic wafer 164, which include through-vias 60 and bond pads 62.

Figure 39:
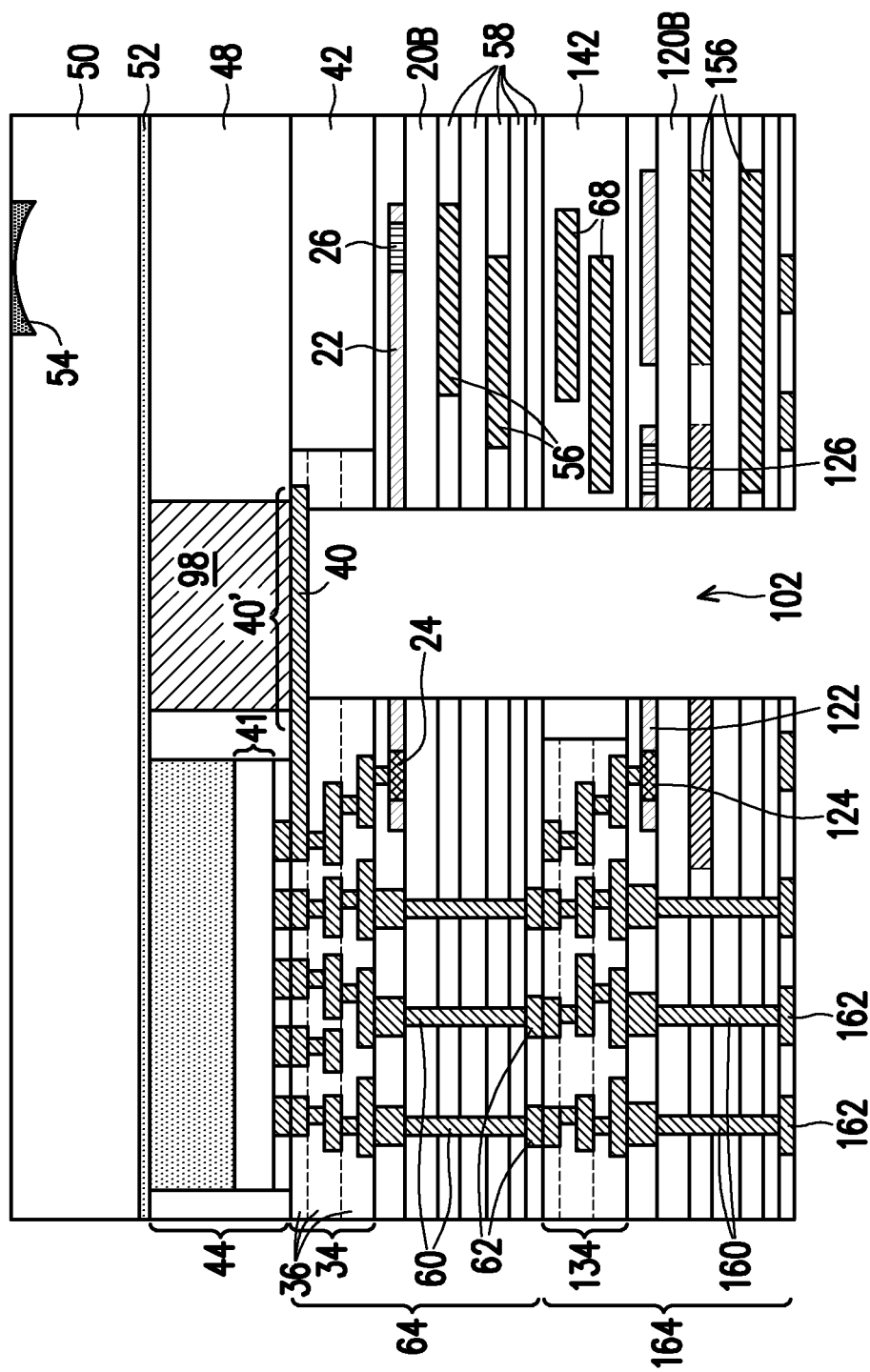

Referring to FIG. 39, an anisotropic etching process is performed to etch-through photonic wafer 164, dielectric layers 56, dielectric layer 20B, and the dielectric layers 36 in interconnect structure 34. Opening 102 is thus formed. In accordance with some embodiments, opening 102 stops on metal pad 40' in interconnect structure 34.

Figure 40:
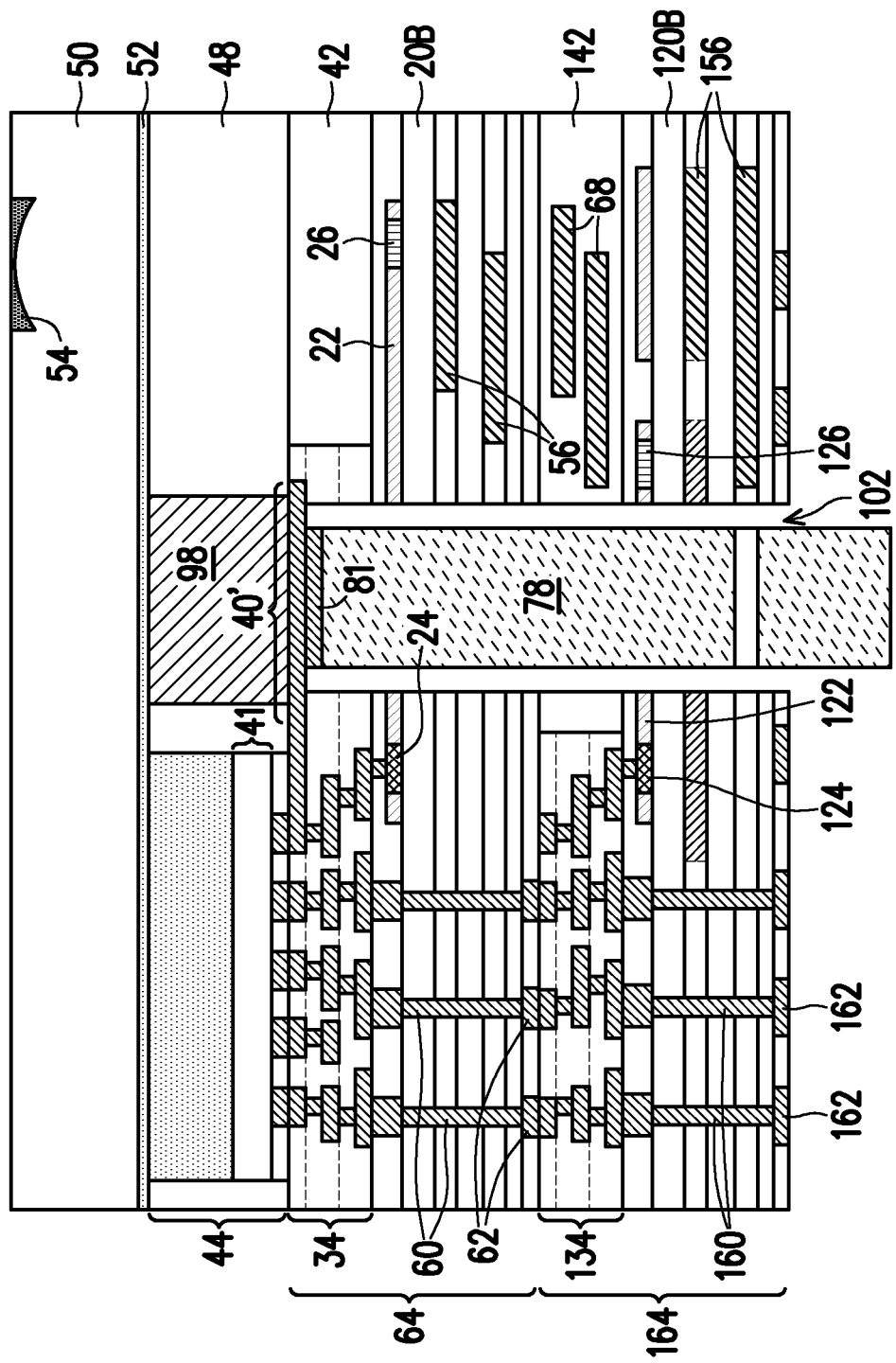
Figure 41:
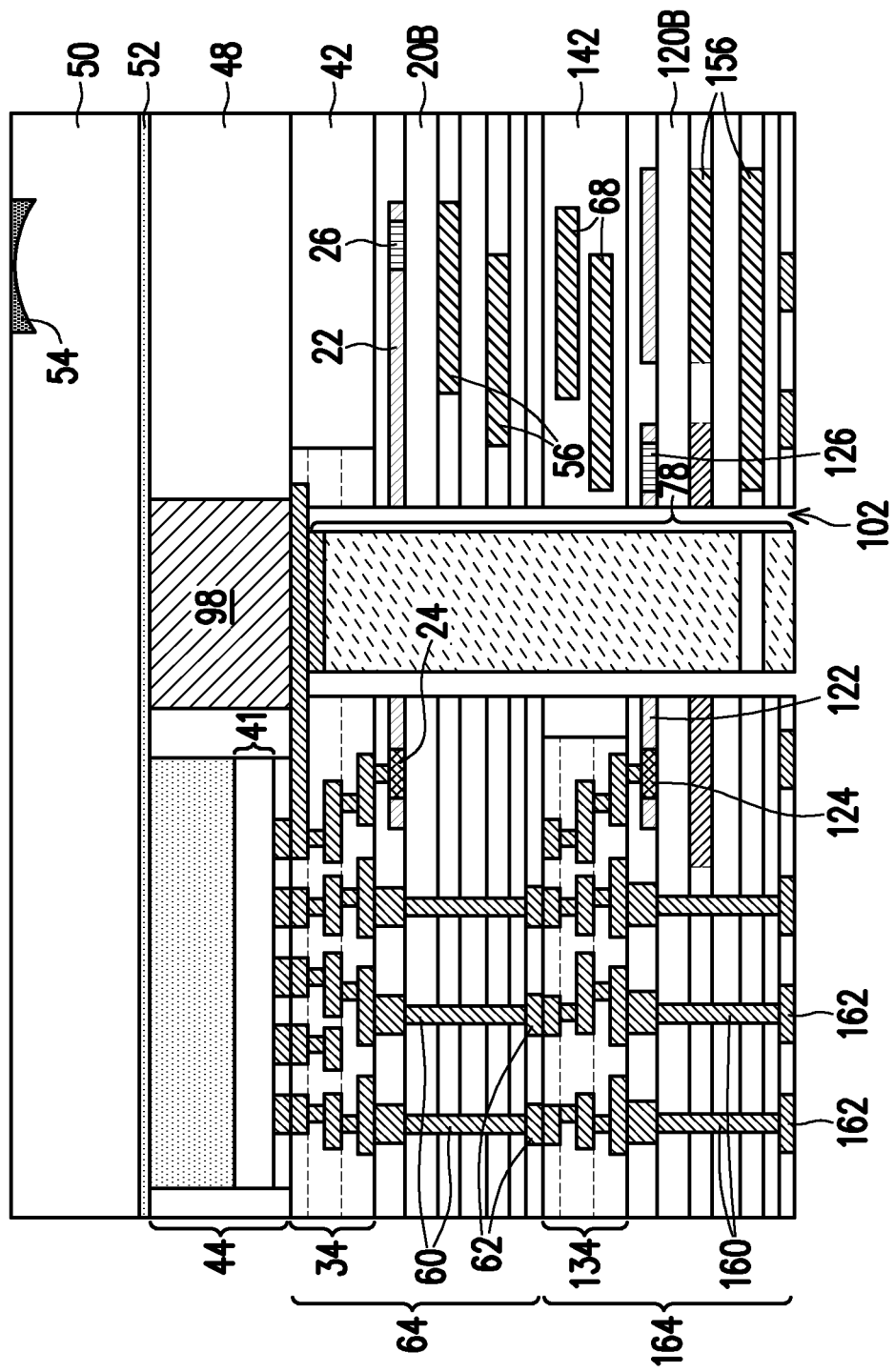
Figure 42:
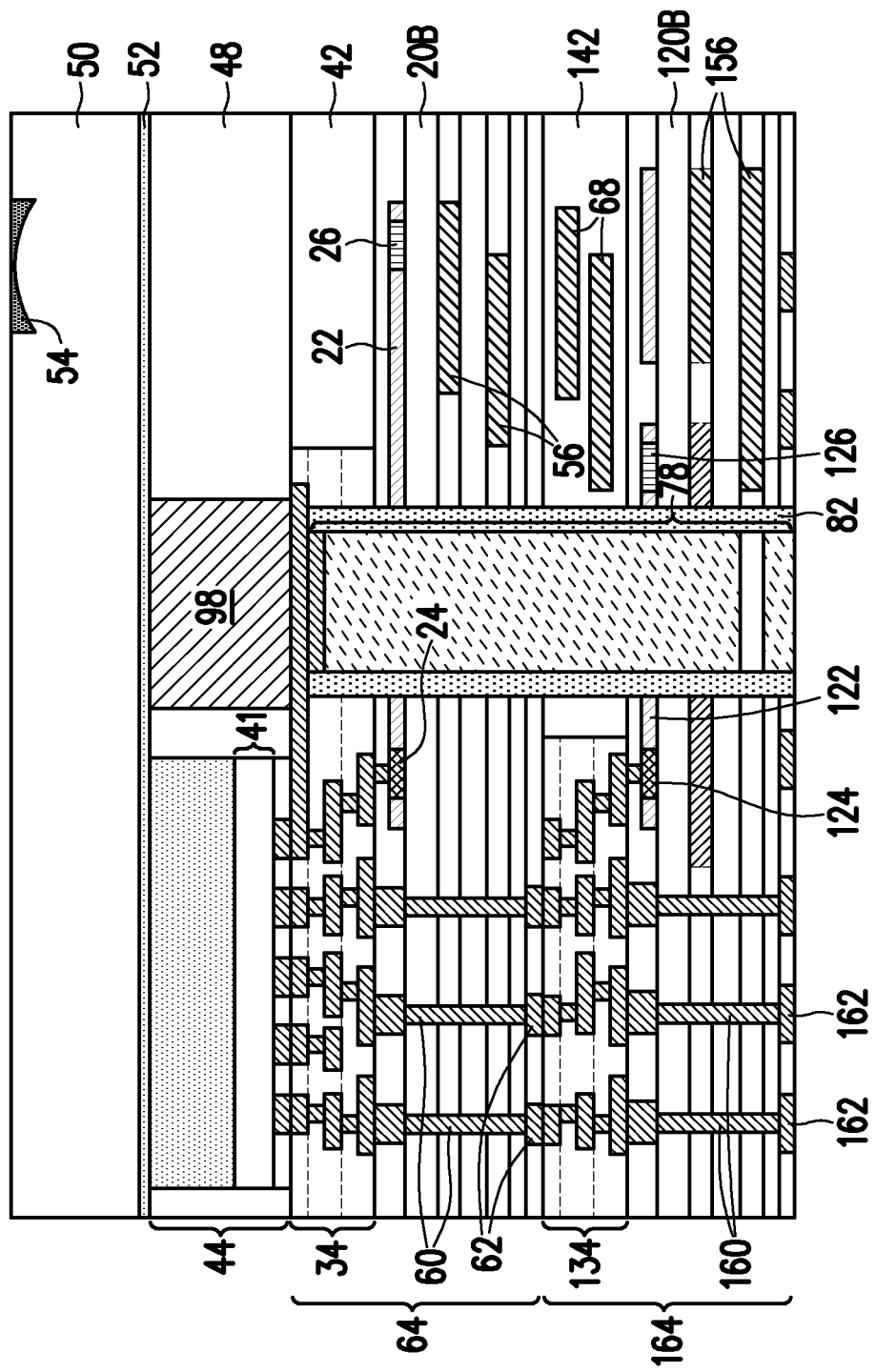
Figure 43:
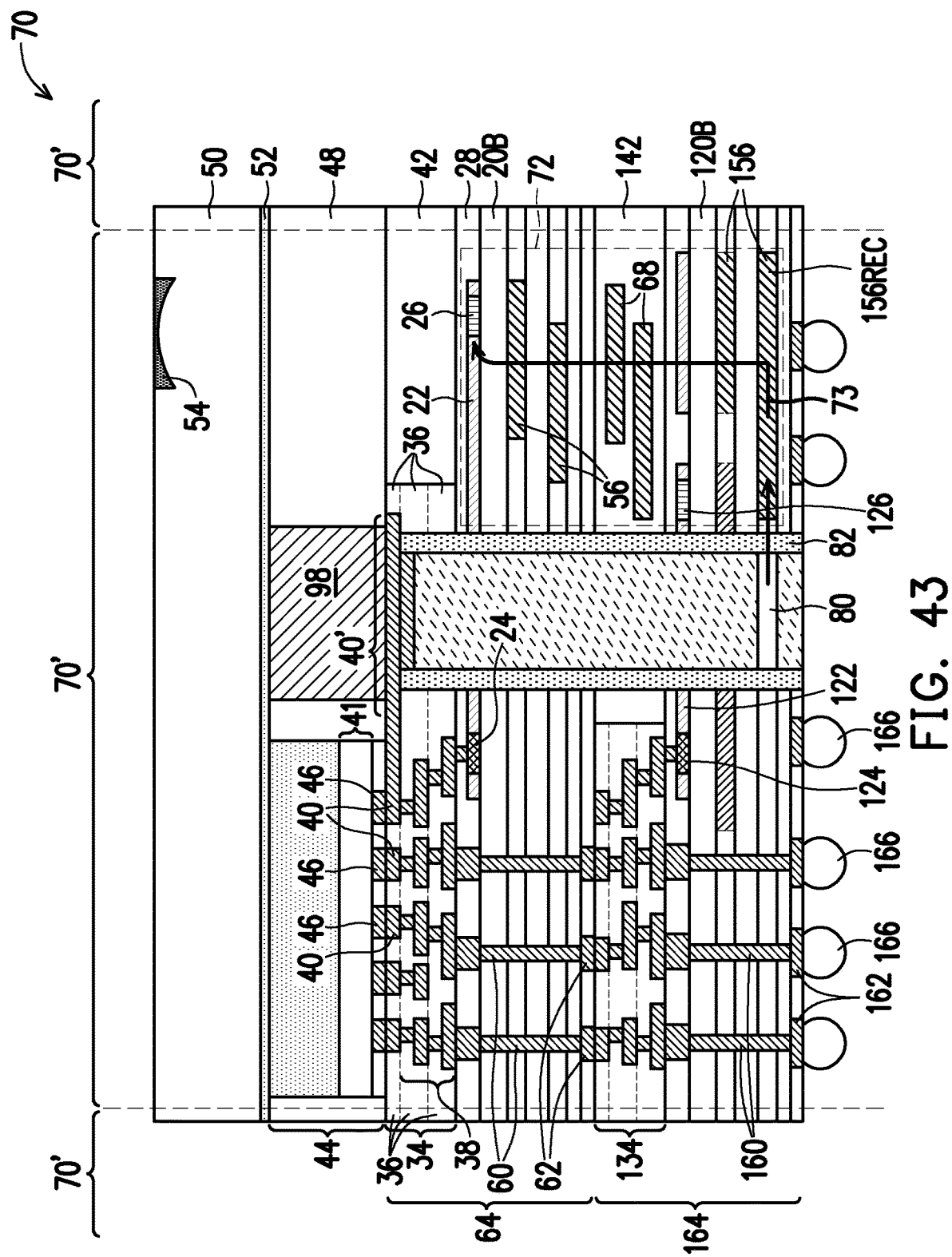

FIG. 40 illustrates the attachment of photonic component 78 to metal pad 40', with the electrode 81 in photonic component 78 bonding to and electrically connected to metal pad 40'. Next, as shown in FIG. 41, a planarization process is preformed to remove the portion of photonic component 78 that extends outside of opening 102. Next, optical glue 82 is dispensed and cured, as shown in FIG. 42. In accordance with some embodiments, the processes as shown in FIGS. 41 and 42 may be reversed. FIG. 43 illustrates the formation of electrical connectors 166, so that photonic wafer 70 is formed. In subsequent processes, a singulation process is performed to saw apart the discrete photonic packages 70' from each other. The light path from light-emitting region 80 in photonic component 78 to nitride waveguide 156REC, and to waveguide 22 and grating coupler 26 is also shown.

Figure 44:
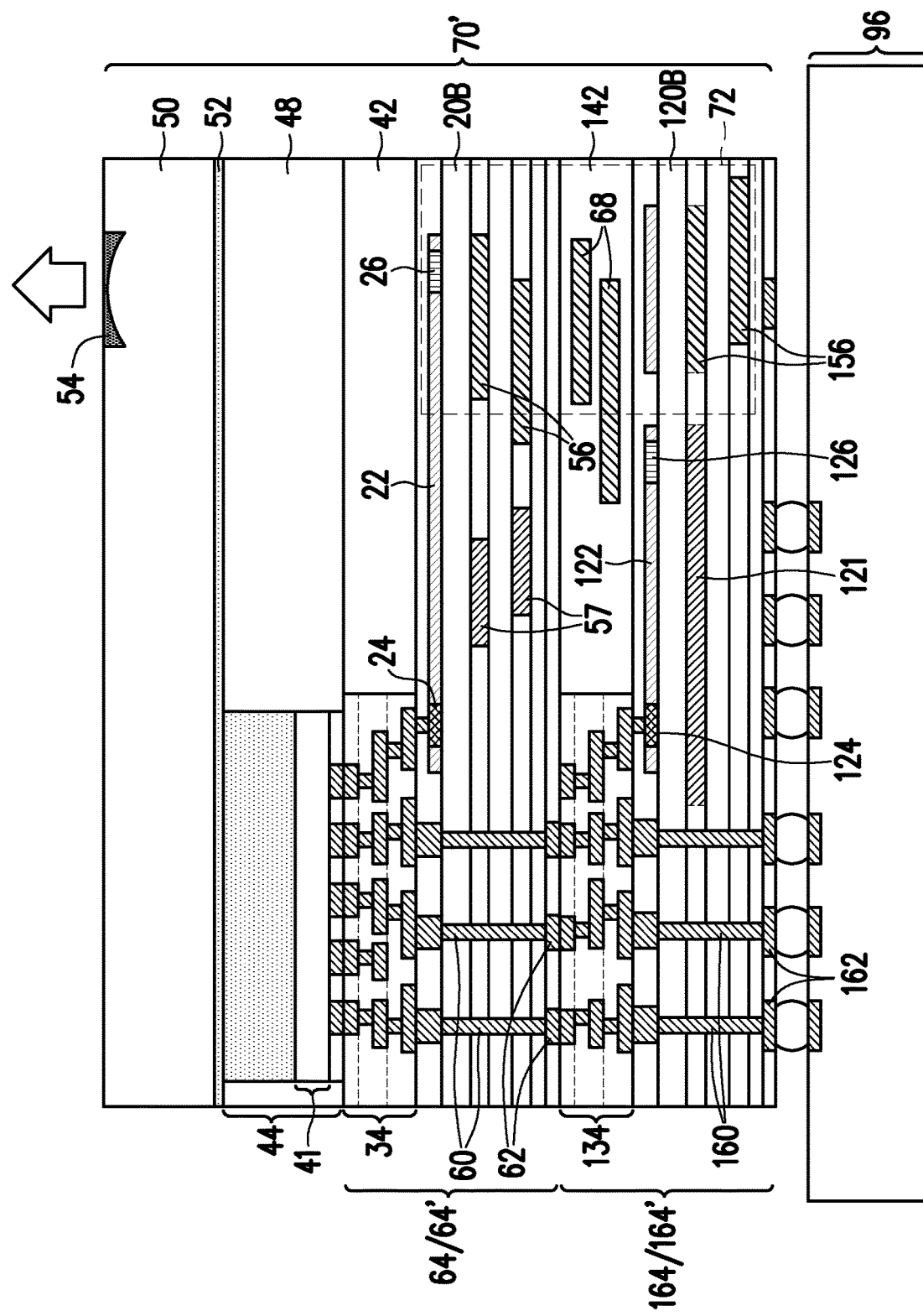
FIG. 44 illustrates a package adopting backside illumination in accordance with some embodiments.

The embodiments of the present application may adopt a front-side illumination scheme, wherein light may be emitted or received from the front side of the photonic package 70'. For example, FIG. 44 illustrates a photonic package 70' adopting front-side illumination, wherein the front-side refers to the front-side of photonic dies 64 and 164. In FIG. 44, a package component 96, which may be an interposer, a package component, a package, a printed circuit board, or the like, is bonded to photonic package 70'.

Figure 45:
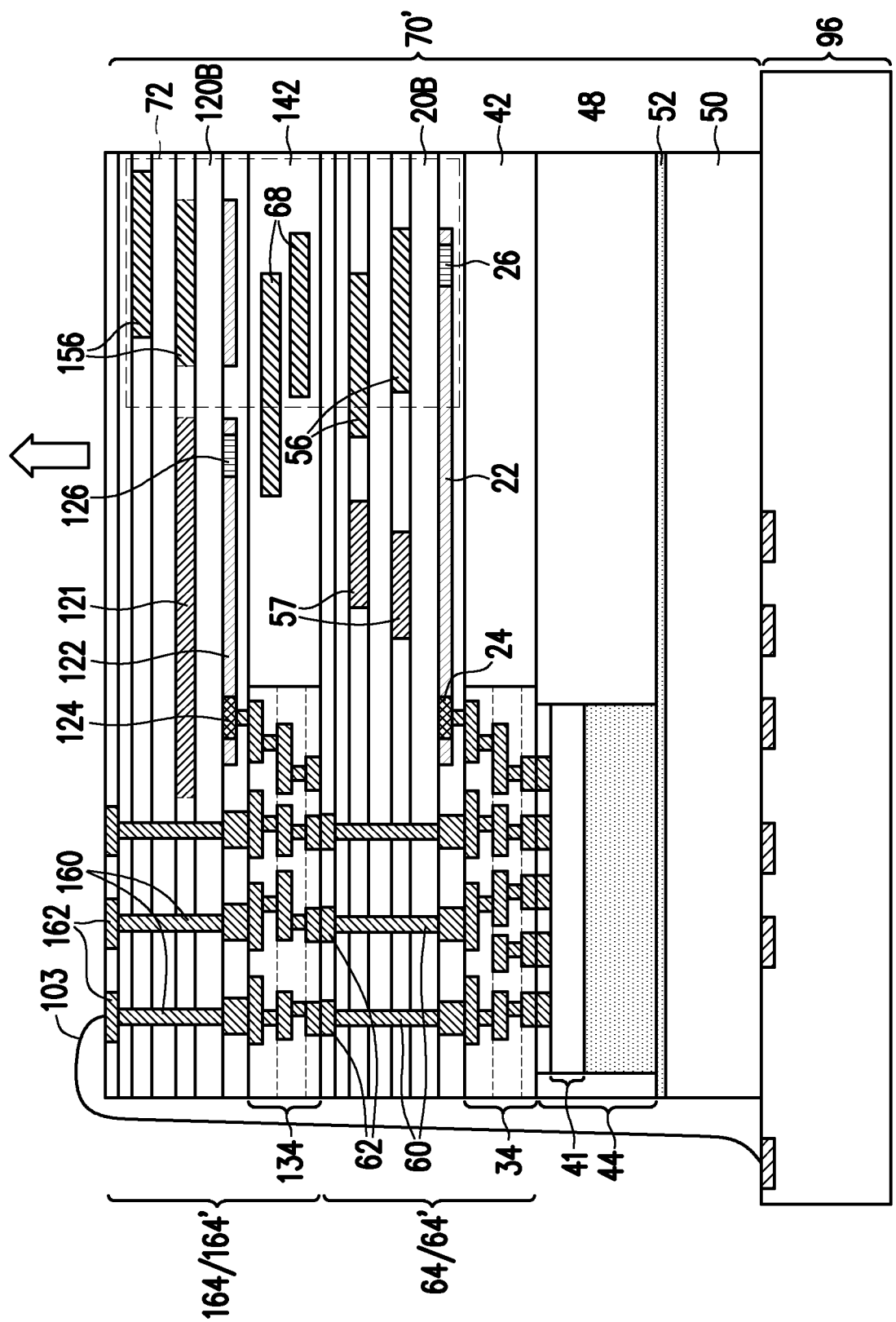
FIG. 45 illustrates a package adopting front illumination in accordance with some embodiments.
Figure 46:
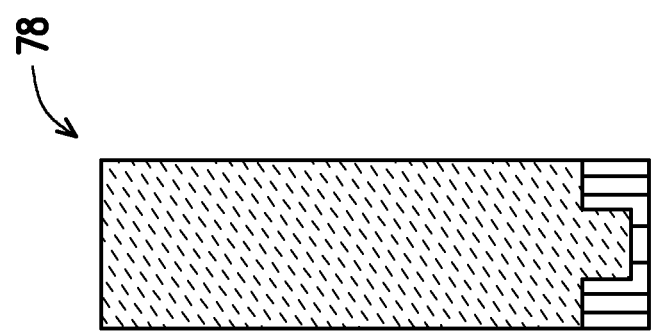
FIG. 46 illustrates a side view of an optical device in accordance with some embodiments.

FIG. 45 illustrates a photonic package 70' adopting backside illumination scheme. With the backside illumination, more chip area may be used for sensor illumination (if image sensors are adopted), and the density of the image sensors may be increased. The process flow for packaging the corresponding photonic package is similar to what has been discussed in preceding embodiments, except that wire bonding (through bond wire 103) is performed to electronically connect photonic package 70' to an underlying package component. In FIG. 44, a package component 96, which may be an interposer, a package component, a package, a printed circuit board, or the like, is attached to photonic package 70'.

In above-illustrated embodiments, some processes and features are discussed in accordance with some embodiments of the present disclosure to form a three-dimensional (3D) package. Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

The embodiments of the present disclosure have some advantageous features. By stacking photonic dies with an electronic die, the footage of the corresponding photonic package is reduced. Optical through-vias including nitride waveguides and silicon waveguides may be adopted to provide optical communication between the photonic dies without the need of using optical fibers.

In accordance with some embodiments of the present disclosure, a method includes forming a first photonic die comprising forming a first silicon waveguide; and forming a first nitride waveguide; forming a first through-via extending into a first plurality of dielectric layers in the first photonic die; bonding a second photonic die to the first photonic die, wherein the second photonic die comprises a second nitride waveguide, wherein the first silicon waveguide is optically coupled to the second nitride waveguide through the first nitride waveguide; and forming a second through-via extending into a second plurality of dielectric layers in the second photonic die. In an embodiment, the method further comprises bonding an electronic die to the first photonic die, wherein the second through-via is electrically coupled to the electronic die through the first through-via. In an embodiment, the forming the first silicon waveguide comprises etching a silicon layer on an oxide layer of a base substrate, and the method further comprises forming a redistribution structure over the oxide layer, wherein the redistribution structure comprises a third plurality of dielectric layers and a plurality of redistribution lines in the third plurality of dielectric layers. In an embodiment, the etching the silicon layer further forms a grating coupler. In an embodiment, the base substrate further comprises a bulk silicon substrate underlying the oxide layer, and the method further comprises, before the bonding the second photonic die to the first photonic die, removing the bulk silicon substrate. In an embodiment, the base substrate further comprises a bulk silicon substrate underlying the oxide layer, and the method further comprises, before the bonding the second photonic die to the first photonic die, thinning the bulk silicon substrate; and etching the bulk silicon substrate that has been thinned to form a second silicon waveguide. In an embodiment, the second silicon waveguide optically couples the second nitride waveguide to the first silicon waveguide. In an embodiment, the forming the first photonic die further comprises forming a third nitride waveguide, wherein the third nitride waveguide is optically coupled between the second nitride waveguide and the first nitride waveguide. In an embodiment, the forming the first photonic die further comprises forming a fourth nitride waveguide, wherein the fourth nitride waveguide optically couples the second nitride waveguide to the first silicon waveguide. In an embodiment, the method further comprises attaching a photonic component, wherein the photonic component comprises a light-emitting region aligned to the second nitride waveguide, and wherein the second nitride waveguide is configured to receive a light beam emitted from the light-emitting region. In an embodiment, the method further comprises attaching a silicon supporting substrate, wherein the second photonic die and the silicon supporting substrate are on opposite sides of the first photonic die.

In accordance with some embodiments of the present disclosure, a package includes a first photonic die comprising a first silicon waveguide; a first plurality of dielectric layers underlying the first silicon waveguide; a first nitride waveguide in one of the first plurality of dielectric layers; and a first through-via penetrating through the first plurality of dielectric layers; a second photonic die underlying and bonding to the first photonic die, wherein the second photonic die comprises a second plurality of dielectric layers; a second nitride waveguide in one of the second plurality of dielectric layers, wherein the second nitride waveguide is optically coupled to the first silicon waveguide through the first nitride waveguide; and a second through-via penetrating through the second plurality of dielectric layers; and a conductive feature underlying the second through-via, and electrically connected to the first through-via through the second through-via. In an embodiment, the package further comprises an electronic die over and bonding to the first photonic die, wherein the second through-via is electrically connected to the electronic die through the first through-via. In an embodiment, the package further comprises a photonic component, wherein the photonic component comprises a light-emitting region aligned to the second nitride waveguide, and wherein the second nitride waveguide is configured to receive a light beam emitted from the light-emitting region. In an embodiment, the first photonic die and the second photonic die are configured to optically transfer the light beam to the first silicon waveguide. In an embodiment, the package further comprises a second silicon waveguide in a dielectric layer in the second plurality of dielectric layers.

In accordance with some embodiments of the present disclosure, a package includes an electronic die; and a plurality of photonic dies stacked to form a die stack, wherein the electronic die is bonded to a top photonic die in the die stack, and wherein each of the plurality of photonic dies comprises a plurality of dielectric layers; an electrically conductive path penetrating through the plurality of dielectric layers; and a nitride waveguide, wherein the nitride waveguides in the plurality of photonic dies are optically coupled, and are configured to transfer a light in a bottom die in the plurality of photonic dies to a top die in the plurality of photonic dies. In an embodiment, one of the plurality of photonic dies further comprises a silicon waveguide. In an embodiment, the package further comprises a laser diode comprising a light-emitting region aligned to the nitride waveguide in one of the plurality of photonic dies. In an embodiment, the package further comprises a photo diode comprising a light-emitting region aligned to a light-receiving nitride waveguide in one of the plurality of photonic dies, wherein the photo diode and the one of the plurality of photonic dies are configured to allow the light-receiving nitride waveguide to receive a light beam emitted from the light-emitting region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A package comprising:
    a photonic device comprising a micro lens;
    a first photonic die underlying the photonic device, wherein the first photonic die comprises a first plurality of waveguides;
    a second photonic die underlying and bonding to the first photonic die, wherein the second photonic die comprises:
        a second plurality of waveguides, wherein first ones of the first plurality of waveguides and second ones of the second plurality of waveguides collectively form parts of an optical through-via that penetrates through the first photonic die and extends into the second photonic die, and wherein a waveguide in the second photonic die is optically coupled to the photonic device through the optical through-via; and
        a laser diode comprising a light-emitting region aligned to a light-receiving nitride waveguide in the second photonic die, wherein the laser diode is optically coupled to the micro lens through the optical through-via, and wherein the laser diode extends from a first level to a second level, and wherein the first level is a top surface level of the first photonic die, and the second level is a bottom level of the second photonic die; and
    an electronic die over and bonding to the first photonic die, wherein the second photonic die is electrically connected to the electronic die.

2. The package of claim 1, wherein the first ones of the first plurality of waveguides in the optical through-via are at different levels and physically separated from each other, and are optically inter-coupled.

3. The package of claim 2, wherein the second ones of the second plurality of waveguides comprise a topmost waveguide of the second photonic die, and the topmost waveguide is physically separated from, and is optically coupled to, a bottommost waveguide in the first photonic die.

4. The package of claim 1, wherein the first plurality of waveguides comprise a first silicon waveguide and a first nitride waveguide.

5. The package of claim 4, wherein the second plurality of waveguides comprise a second silicon waveguide and a second nitride waveguide optically coupled to the first silicon waveguide and the first nitride waveguide.

6. The package of claim 1 further comprising a supporting substrate over the first photonic die, wherein the micro lens is in the supporting substrate.

7. The package of claim 6 further comprising an additional supporting substrate between the supporting substrate and the first photonic die.

8. The package of claim 1, wherein the laser diode is aside of the first photonic die and the second photonic die.

9. The package of claim 8 further comprising an optical glue attaching the laser diode to the first photonic die and the second photonic die.

10. The package of claim 1, wherein the laser diode is inside the first photonic die and the second photonic die.

11. The package of claim 10 further comprising a thermal block formed of silicon or a metal, wherein the thermal block overlaps, and is thermally coupled to the laser diode.

12. A package comprising:
    an electronic die;
    a plurality of photonic dies stacked to form a die stack, wherein the electronic die is bonded to a top photonic die in the die stack, and wherein the plurality of photonic dies comprise an optical through-via therein;
    a laser diode comprising a light-emitting region aligned to a light-receiving nitride waveguide in a bottom die of the plurality of photonic dies; and
    a silicon supporting substrate over and bonding to the electronic die, wherein the silicon supporting substrate comprises:
        a micro lens, wherein the micro lens is optically coupled to the laser diode through the optical through-via in the plurality of photonic dies.

13. The package of claim 12, wherein each of the plurality of photonic dies comprises a silicon waveguide and a nitride waveguide that are vertically aligned, and wherein the silicon waveguide is physically separated from, and is optically coupled to, the nitride waveguide.

14. The package of claim 12 further comprising an optical glue in a space between the laser diode and the plurality of photonic dies.

15. The package of claim 12 further comprising:
    a thermal block over the laser diode;
    a metal pad underlying and contacting the thermal block; and
    an electrode joining the laser diode to the metal pad.

16. A package comprising:
    an electronic die;
    a first photonic die underlying the electronic die, wherein the first photonic die comprises:
        a first plurality of waveguides forming a first optical path penetrating through the first photonic die; and
        a first plurality of electrical conductive features forming a first electrical conductive path penetrating through the first photonic die;
    a second photonic die underlying and bonding to the first photonic die, wherein the second photonic die comprises:
        a second plurality of waveguides forming a second optical path penetrating through the second photonic die, wherein the second optical path is optically coupled to the first optical path to allow an optical signal to transfer through the first photonic die; and
        a second plurality of electrical conductive features forming a second electrical conductive path penetrating through the second photonic die, wherein the second electrical conductive path is electrically connected to the electronic die through the first electrical conductive path; and a laser diode aside of the first photonic die and the second photonic die, wherein the laser diode comprises a first top surface higher than a first bottom surface of the electronic die, and a second bottom surface lower than a second top surface of the second photonic die.

17. The package of claim 16 further comprising a supporting substrate over the electronic die and the first photonic die.

18. The package of claim 17, wherein the laser diode is attached to the supporting substrate.

19. The package of claim 16, wherein the laser diode is configured to emit the optical signal in a direction parallel to an interface between the first photonic die and the second photonic die.

20. The package of claim 16 further comprising a plurality of electrical connectors underlying the second photonic die, wherein the plurality of electrical connectors are electrically connected to the electronic die through the first electrical conductive path and the second electrical conductive path.

* * * * *